United States Patent Office 3,461,461
Patented Aug. 12, 1969

3,461,461
6-AMINO-4-(SUBSTITUTED AMINO)-1,2-DIHYDRO-
1-HYDROXY-2-IMINOPYRIMIDINES
William C. Anthony, Kalamazoo, and Joseph J. Ursprung, Portage, Mich., assignors to The Upjohn Company, Kalamazoo, Mich., a corporation of Delaware
No Drawing. Filed Nov. 1, 1965, Ser. No. 505,993
The portion of the term of the patent subsequent to May 7, 1985, has been disclaimed
Int. Cl. C07d 51/42, 87/28
U.S. Cl. 260—256.4    4 Claims

ABSTRACT OF THE DISCLOSURE

6 - amino - 1,2-dihydro-1-hydroxy-2-iminopyrimidines, their carboxyacylated counterparts, and the corresponding acid addition salts thereof are disclosed. These compounds, useful inter alia as antihypertensive agents, are substituted in the 4-position and optionally in the 5-position, the substituent in the 4-position being a secondary or tertiary amino moiety.

---

This invention relates to novel compositions of matter and to methods for producing them. In particular, this invention relates to novel 1,2-dihydro-1-hydroxypyrimidines of the formula:

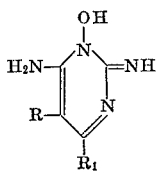

I wherein $R_1$ is a moiety selected from the group consisting of moieties of the formula

wherein $R_3$ and $R_4$ are selected from the group consisting of hydrogen, lower alkyl, lower alkenyl, lower aralkyl, and lower cycloalkyl, with the proviso that both $R_3$ and $R_4$ are not hydrogen, and the heterocyclic moieties, aziridinyl, azetidinyl, pyrrolidinyl, piperidino, hexahydroazepinyl, heptamethylenimino, octamethylenimino, morpholino, and 4-lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of $R_1$ to the ring in said formula. When $R_1$ is

$R_3$ and $R_4$ can be alike or different. When $R_1$ is a heterocyclic moiety, the alkyls which can be attached thereto can all be different or any two or all of them can be alike.

R in Formula I is a monovalent moiety which can be the same as or different than $R_1$. Although R can be any of a large variety of atoms or groups of atoms, this invention relates especially to compounds of the formulas:

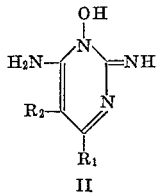 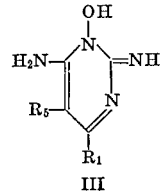

II      III

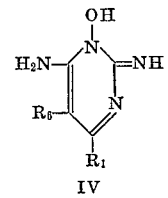

IV wherein, in each instance, $R_1$ is as defined above.

In Formula II, $R_2$ is selected from the group consisting of hydrogen, lower alkyl, lower alkenyl, lower alkoxyalkyl, lower cycloalkyl, lower aryl, lower aralkyl, lower alkaryl, lower alkaralkyl, lower alkoxyaralkyl, and lower haloaralkyl. In Formula III, $R_5$ is selected from the group consisting of chlorine, bromine, iodine, nitroso, nitro, amino, phenylthio, lower alkylphenylthio, and halophenylthio. In Formula IV, $R_6$ is assigned the same definition as $R_1$, above. $R_6$ can be the same as or different than $R_1$, within the scope of that definition.

The novel 1,2 - dihydro-1-hydroxypyrimidines of this invention can be represented by formulas other than Formulas I, II, III and IV. For example, with regard to Formula I, among such other formulas are:

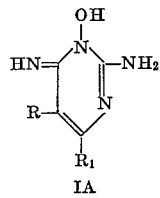 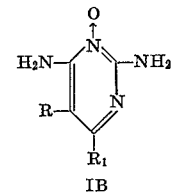

IA      IB

Compounds of Formulas IA and IB are tautomeric with compounds of Formula I. For convenience, reference will be made hereinafter only to Formulas I, II, III and IV. It is to be understood, however, that the novel compounds of this invention are likely to be mixtures of tautomeric forms, the compositions of which are dependent on such factors as the nature of $R_1$, $R_2$, $R_5$, and $R_6$, and the environment. In some instances, one form or another may predominate.

Examples of lower alkyl are methyl, ethyl, propyl, butyl, pentyl, hexyl, heptyl, octyl, and isomeric forms thereof. Examples of lower alkenyl are allyl, 1-methylallyl, 2-methylallyl (methallyl), 2-butenyl (crotyl), 3-butenyl, 1,2-dimethylallyl, 1,1-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,1,2-trimethylallyl, 1,3-dimethyl-2-butenyl, 1-ethyl-2-butenyl, 4-methyl-2-pentenyl, 2-ethyl-2-pentenyl, 4,4-dimethyl-2-pentenyl, 2-heptenyl, 2-octenyl, 5-octenyl, 1,4-dimethyl-4-hexenyl, and the like. Examples of lower alkoxyalkyl are 2-methoxyethyl, 2-ethoxyethyl, 2-butoxyethyl, 2-hexyloxyethyl, 2-octyloxyethyl, 2 - methoxypropyl, 3 - methoxypropyl, 3-propoxypropyl, 2-methoxybutyl, 3-ethoxybutyl, 4-butoxybutyl, 2-ethoxyhexyl, 3-methoxy-3-methylpentyl, 4-methoxyoctyl, and the like. Examples of lower cycloalkyl are cyclopropyl, 2-methylcyclopropyl, 2,2-dimethylcyclopropyl, 2,3-diethylcyclopropyl, 2-butylcyclopropyl, cyclobutyl, 2-methylcyclobutyl, 3-propylcyclobutyl, 2,3,4-triethylcyclobutyl, cyclopentyl, 2,2 - dimethylcyclopentyl, 3-pentylcyclopentyl, 3-tert-butylcyclopentyl, cyclohexyl, 4-tert-butylcyclohexyl, 3 - isopropylcyclohexyl, 2,2 - dimethylcyclohexyl, cycloheptyl, cyclooctyl, and the like. Examples of lower aryl are phenyl, 1-naphthyl, and 2-naphthyl. Examples of lower alkaryl are o-tolyl, m-tolyl, p-tolyl, m-ethylphenyl, p-tert-butylphenyl, the isomeric forms of xylyl, the isomeric forms of trimethylphenyl, 4-methyl-1-naphthyl, 6-propyl-2-naphthyl, 2,4,5,7-tetramethyl-1-naphthyl, and the like. Examples of lower aralkyl are benzyl, phenethyl, 1-phenylethyl, 2 - phenylpropyl, 4 - phenylbutyl, 6-phenylhexyl, 5-phenyl-2-methylpentyl, 1-naphthylmethyl, 2-(1-naphthyl)ethyl, 2-(2-naphthyl)ethyl, and the like. Examples of lower alkaralkyl are o-tolylmethyl, m-tolylmethyl, p-tolylmethyl, 4 - tert-butylphenylmethyl, 2-(p-tolyl)ethyl, 1-(m-tolyl)ethyl, 3-(o-ethylphenyl)propyl, 4-methyl-1-naphthylmethyl, 6-tert-butyl-2-naphthylmethyl, and the like. Examples of lower alkoxyaralkyl are o-methoxybenzyl, m-methoxybenzyl, p-methoxybenzyl, 2 - (m-methoxyphenyl)ethyl, 3 - (p-ethoxyphenyl)propyl, 4-(p-tert-butoxyphenyl)butyl, 4 - methoxy-1-naphthylmethyl, and the like. Examples of lower haloaralkyl are o-chlorobenzyl, m-fluorobenzyl, p-bromobenzyl, 2 - (m-iodophenyl)ethyl, 2,4 - dichlorobenzyl, 6-bromo-1-naphthylmethyl, 4-(p-chlorophenyl)butyl, and the like. Examples of lower alkylphenylthio are o-tolylthio, m-tolylthio, p-tolylthio, the isomeric forms of xylylthio, p-ethylphenylthio, m-butylphenylthio, and the like. Examples of halophenylthio are p-chlorophenylthio, m-bromophenylthio, o-fluorophenylthio, 3,4-dichlorophenylthio, and the like.

Examples of heterocyclic moieties within the scope of $R_1$, in addition to those already mentioned above, are 2-methylaziridinyl, 2-ethylaziridinyl, 2-butylazirindinyl, 2,3-dimethylaziridinyl, 2,2-dimethylaziridinyl, 2-methylazetidinyl, 3-methylazetidinyl, 2-octylazetidinyl, 2,2-dimethylazetidinyl, 3,3-diethylazetidinyl, 2,4,4-trimethylazetidinyl, 2,3,4-trimethylazetidinyl, 2-methylpyrrolidinyl, 3-butylpyrrolidinyl, 2-isohexylpyrrolidinyl, 2,3-dimethylpyrrolidinyl, 2,2-dimethylpyrrolidinyl, 2,5 - diethylpyrrolidinyl, 3-tert-butylpyrrolidinyl, 2,3,5-trimethylpyrrolidinyl, 3,4-dioctylpyrrolidinyl, 2 - methylpiperidino, 3-methylpiperidino, 4-methylpiperidino, 3-isopropylpiperidino, 4-tert-butylpiperidino, 2-methyl-5-ethylpiperidino, 3,5-dipentylpiperidino, 2,4,6-trimethylpiperidino, 2,6-dimethyl-4-octylpiperidino, 2,3,5-triethylpiperidino, 2-ethylhexahydroazepinyl, 4-tert-butylhexahydroazepinyl, 3-heptylhexahydroazepinyl, 2,4-dimethylhexahydroazepinyl, 3,3 - dimethylhexahydroazepinyl, 2,4,6 - tripropylhexahydroazepinyl, 2-methylheptamethylenimino, 5 - butylheptamethylenimino, 2,4 - diisopropylheptamethylenimino, 3,3 - diethylheptamethylenimino, 2,5,8-trimethylheptamethylenimino, 3-methyloctamethylenimino, 2,9-diethyloctamethylenimino, 4-isooctyloctamethylenimino, 2-ethylmorpholino, 2-methyl-5-ethylmorpholino, 3,3-dimethylmorpholino, 2,6-ditert-butylmorpholino, 4-methylpiperazinyl, 4-isopropylpiperazinyl, and the like. In each of the above examples of heterocyclic moieties, the free valence, and hence the point of attachment to a carbon atom of the pyrimidine ring, is at the heterocyclic nitrogen atom.

The novel 1,2 - dihydro-1-hydroxypyrimidines of Formulas I, II, III and IV are amines, and exist in the nonprotonated or free base form, or in the protonated or acid addition salt form, depending on the pH of the environment. They form stable protonates, i.e., mono- or diacid addition salts, on neutralization with suitable acids, for example, hydrochloric, hydrobromic, sulfuric, phosphoric, nitric, acetic, benzoic, salicylic, glycolic, succinic, nicotinic, tartaric, maleic, malic, pamoic, methanesulfonic, cyclohexanesulfamic, picric, and lactic acids, and the like. These acid addition salts are useful for upgrading or purifying the free bases. The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from vicinal carbon atoms.

The novel Formula I, II, III and IV compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The Formula I, II, III and IV 1,2-dihydro-1-hydroxypyrimidines of this invention also form salts with penicillins. These salts have solubility characteristics which cause them to be useful in the isolation and purification of penicillins, particularly benzyl penicillin. Said salts can be formed either by neutralization of the free base form of a compound of Formula I, II, III or IV with the free acid form of a penicillin, or by a metathetical exchange of the anion of an acid addition salt of a Formula I, II, III or IV compound, for example, the chloride ion of a hydrochloride, with the anionic form of a penicillin.

The novel Formula I, II, III and IV 1,2-dihydro-1-hydroxypyrimidines also form carboxyacylates on treatment with carboxyacylating agents, for example, carboxylic acid anhydrides and carboxylic acid chlorides. These carboxyacylates can be single compounds or mixtures of compounds depending on such factors as the nature of the 1,2-dihydro-1-hydroxypyrimidine reactant, the carboxyacylating agent, and the reaction conditions.

Carboxyacylates obtained from Formula I 1,2-dihydro-1-hydroxypyrimidines can be represetnned by the formula:

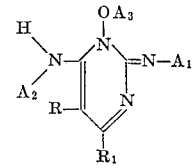

V wherein R and $R_1$ are as defined above. It is especially preferred that R include $R_2$, $R_5$ and $R_6$, as those are defined above. $A_1$, $A_2$ and $A_3$ are each selected from the group consisting of hydrogen and carboxyacyl, with the proviso that at least one of $A_1$ and $A_2$ is carboxyacyl.

The carboxyacylates of Formula V can be used for upgrading a Formula I, II, III or IV 1,2-dihydro-1-hydroxypyrimidine free base. The latter can be transformed to a carboxyacylate, the carboxyacylate purified by conventional techniques, e.g., recrystallization or chromatography, and the purified carboxyacylate deacylated, advantageously by alcoholysis.

The dihydropyrimidine carboxyacylates of Formula V can be represented by other formulas. As for Formula I compounds, these Formula V carboxyacylates are likely to be mixtures of tautomeric forms, the compositions of which are dependent on such factors as the nature of the substituents and the carboxyacyl moieties, and the environment. In some instances, one form or another may predominate. Formula V is used for convenience, and the other tautomeric forms are not excluded.

Carboxyacylates of Formula V are amines and exist in either the nonprotonated (free base) form or the protonated (acid addition salt) form depending upon the pH of the environment. They form stable protonates on neutralization with suitable strong acids, for example, hydrochloric acid, sulfuric acid, phosphoric acid, perchloric acid, and the like. These acid addition salts are useful for upgrading or purifying the carboxyacylate free bases.

The novel compounds of this invention, including the free bases of Formulas I, II, III and IV, the acid addition salts thereof, the carboxyacylates of Formula V, and the acid addition salts thereof possess pharmacological activity. For example, they are orally and parenterally active in birds and mammals, including man, as antihypertensive agents having vasodilatory activity, and are useful for lowering blood pressure and for the treatment of shock. They are also useful as antifertility agents, as antiviral agents, as anti-inflammatory agents, and as central nervous system stimulants. These compounds also cause electrolyte and water retention in laboratory animals such as rats and dogs, and hence are useful to produce laboratory animals with larger than normal amounts of sodium ions, potassium ions, chloride ions, and water. Such animals are useful in pharmacological research, for example, in screening compounds for possible diuretic activity and in studying the action of known diuretics.

The compounds of Formula II, for example, wherein $R_2$ is hydrogen or lower alkyl and $R_1$ is dimethylamino, pyrrolidinyl, or piperidino are especially potent as antihypertensive agents in mammals, including man.

The novel 1,2-dihydro-1-hydroxypyrimidines of Formula II are produced by mixing a compound of the formula:

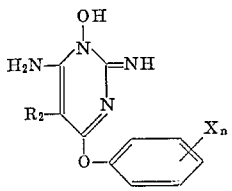

VI wherein X is selected from the group consisting of fluorine, chlorine, and bromine, and $n$ is zero to 3, inclusive, and wherein $R_2$ is as defined above, with an amine of the formula $R_1H$, wherein $R_1$ is as defined above. The phenoxy moiety of the Formula VI reactant is displaced by the $R_1$ moiety of the amine.

The 1,2-dihydro-1-hydroxy-4-phenoxypyrimidines of Formula VI are novel compounds. In addition to being useful as reactants for the production of Formula II 1,2-dihydro-1-hydroxypyrimidines, they are useful for various pharmacological purposes. For example, the Formula VI compounds are orally and parenterally active in birds and mammals, including man, as antihypertensive agents, having vasodilatory activity, and are useful for lowering blood pressure and for the treatment of shock. They are also useful as antifertility agents and antiviral agents, and as agents causing electrolyte and water retention in laboratory animals.

The novel 1,2 - dihydro-1-hydroxy-4-phenoxypyrimidines of Formula VI are produced by mixing a pyrimidine of the formula:

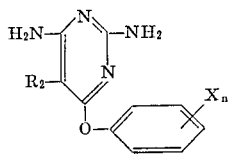

VII wherein X, $n$ and $R_2$ are as defined above, with a percarboxylic acid. Particularly preferred for this purpose are perbenzoic acids of the formula:

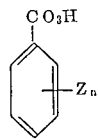

VIII wherein Z is selected from the group consisting of halogen, lower alkyl, lower alkoxy, and nitro, and $n$ is zero to 5, inclusive. However, other percarboxylic acids can be used for this oxidation, examples being performic acid, peracetic acid, perpropionic acid, perbutyric acid, perphthalic acid, percamphoric acid, and the like.

Pyrimidines of Formula VII are prepared by mixing a pyrimidine of the formula:

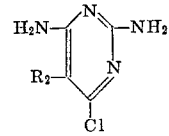

IX wherein $R_2$ is as defined above, with a phenoxide salt of a phenol of the formula:

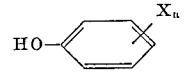

X wherein X and $n$ are as defined above.

2,4-diamino-6-chloropyrimidines of Formula IX are known in the art or can be prepared by methods known in the art. For example, they can be prepared by the following reaction sequence, wherein $R_2$ is as defined above and $R_{10}$ is hydrogen or alkyl:

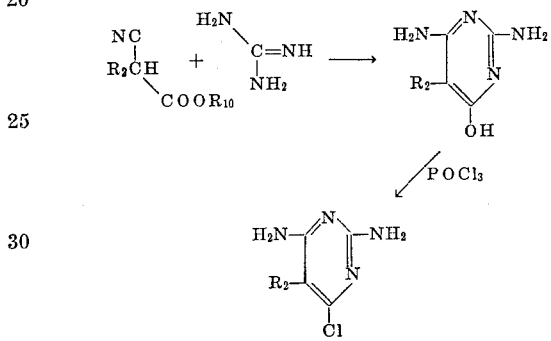

See, for example, J. Am. Chem. Soc. 72, 1914 (1950); Chem. Ber. 94, 12 (1961); Organic Syntheses, Coll. vol. 4, 245 (1963); and U.S. Patent 2,673,204. Illustratively, guanidine and ethyl cyanoacetate are reacted in the presence of sodium ethoxide to give 2,4-diamino-6-hydroxypyrimidine. That product is then reacted with phosphorus oxychloride to give 2,4 - diamino - 6-chloropyrimidine. Similarly, guanidine is reacted with ethyl α-cyanopropionate, ethyl α-cyanophenylacetate, and ethyl α-cyano-β-phenylpropionate to give 2,4 - diamino - 5-methyl-6-hydroxypyrimidine, 2,4-diamino-5-phenyl-6-hydroxypyrimidine, and 2,4 - diamino - 5-benzyl-6-hydroxypyrimidine, respectively. Each of those 2,4-diamino-5-substituted-6-hydroxypyrimidines is then transformed to the corresponding 2,4 - diamino-5-substituted-6-chloropyrimidine by reaction with phosphorus oxychloride.

Formula IX 2,4-diamino-6-chloropyrimidines can also be prepared by the following reaction sequence, wherein $R_2$ is as defined above:

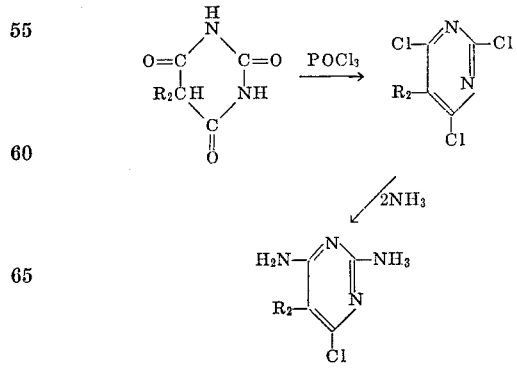

See, for example, Ber. Deut. Chem. Ges. 34, 3362 (1901); ibid., 38, 3394 (1905); ibid., 45, 3124 (1912); ibid., 52, 869 (1919); J. Chem. Soc. (London), 3439 (1951); and British specification 710,070. Illustratively, barbituric acid is reacted with phosphorus oxychloride to give 2,4,6-trichloropyrimidine which is then reacted with ammonia to give 2,4-diamino-6-chloropyrimidine. Similarly, 5-methylbarbituric acid, 5-phenylbarbituric acid, and 5-benzylbarbituric acid are reacted with phosphorus oxychloride to give 2,4,6-trichloro-5-methylpyrimidine, 2,4,6-trichloro-5-phenylpyrimidine, and 2,4,6-trichloro-5-benzylpyrimidine, respectively. Each of those 2,4,6-trichloro-5-substituted-pyrimidines is then reacted with ammonia to give the corresponding 2,4-diamino-5-substituted-6-chloropyrimidine.

The barbituric acid reactants in the above reaction sequence are known or can be prepared by known methods.

The novel 1,2-dihydro-1-hydroxypyrimidines of Formula II wherein $R_5$ is nitroso or nitro can be produced by either of two different reaction sequences. A Formula II 1,2-dihydro-1-hydroxypyrimidine wherein $R_2$ is hydrogen is nitrosated or nitrated. Alternatively, a Formula VI 1,2-dihydro-1-hydroxy-4-phenoxypyrimidine wherein $R_2$ is hydrogen is nitrosated or nitrated, the phenoxy moiety of product thus obtained then being displaced with an amine of the formula $R_1H$, wherein $R_1$ is as defined above. These reaction sequences are as follows:

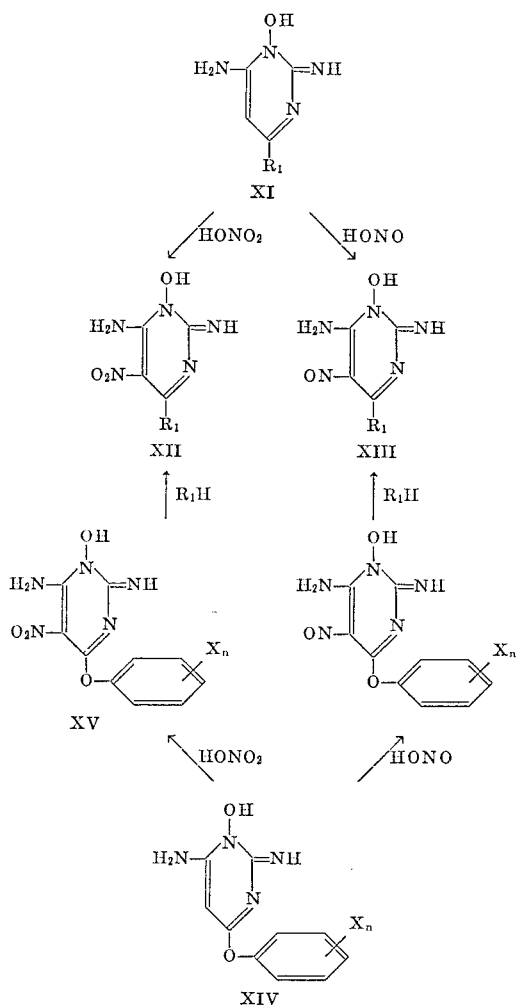

During nitration of Formula XIV 1,2-dihydro-1-hydroxy-4-phenoxypyrimides, there is a tendency for the phenoxy moiety to be nitrated. A nitro substituent in the phenoxy moiety sometimes interferes with a subsequent displacement of the entire phenoxy moiety with a mono- or disubstituted amino moiety as in the production of Formula XII pyrimidines. For that reason, it is usually preferred to produce Formula XII compounds by nitration of Formula XI compounds rather than by the alternative route.

The novel 1,2-dihydro-1-hydroxypyrimidines of Formula III wherein $R_5$ is amino can be produced by any of several different reaction sequences. A Formula XII 1,2- dihydro-1-hydroxy-5-nitropyrimidine or a Formula XIII 1,2-dihydro-1-hydroxy-5-nitrosopyrimidine is mixed with hydrogen in the presence of a hydrogenation catalyst. Alternatively, a Formula XV 1,2-dihydro-1-hydroxy-5-nitro-4-phenoxypyrimidine or a Formula XVI 1,2-dihydro-1-hydroxy-5-nitroso-4-phenoxypyrimidine is mixed with hydrogen in the presence of a hydrogenation catalyst, the phenoxy moiety of the product thus obtained then being displaced with an amine of the formula $R_1H$, wherein $R_1$ is as defined above. These reaction sequences are as follows:

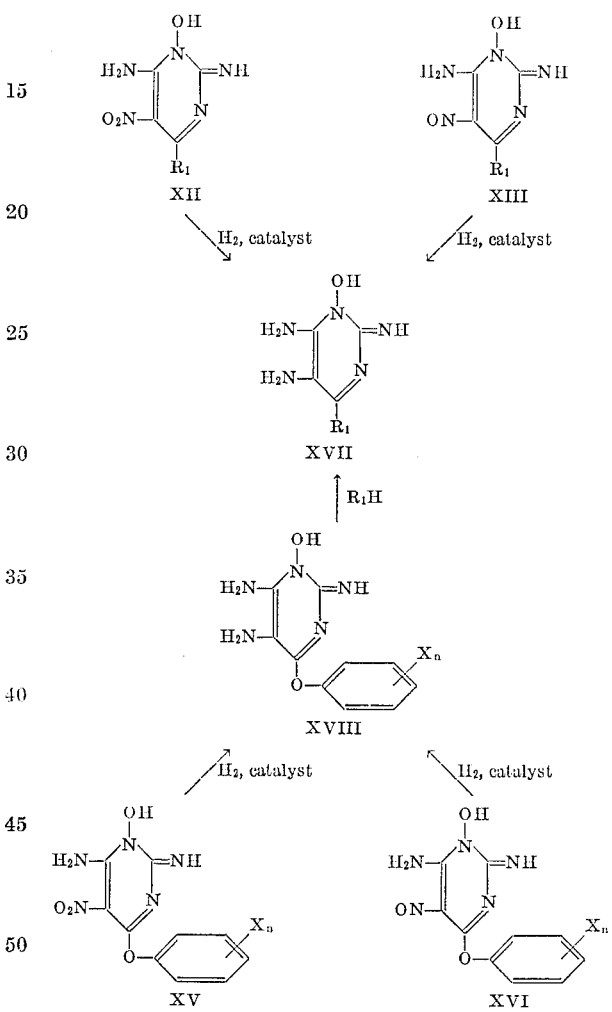

Quite unexpectedly, the carbon-carbon and carbon-nitrogen unsaturation in the 1,2-dihydropyrimidine ring is not hydrogenated with the same ease as the nitroso or nitro moiety. Therefore, the hydrogenation conditions can easily be selected to hydrogenate only the nitroso or nitro moiety. It should be noted, however, that 5-aminopyrimidines of Formula XVII wherein $R_1$ contains an alkenyl moiety cannot be prepared by catalytic hydrogenation of Formula XII 5-nitropyrimidines or Formula XIII 5-nitrosopyrimidines because any alkenyl moieties will be transformed by hydrogenation to alkyl moieties. Formula XVII 5-aminopyrimidines with carbon-carbon unsaturation in the $R_1$ moiety can, however, be prepared by the alternative route, i.e., reduction of the Formula XV 5-nitro-4-phenoxypyrimidine or the Formula XVI 5-nitroso-4-phenoxypyrimidine followed by displacement of the phenoxy moiety with an amine, $R_1H$, which can contain carbon-carbon unsaturation. Alternatively, the nitroso moiety in the Formula XVI or XIII compounds or the nitro moiety in the Formula XV or XII compounds can be reduced by a chemical reducing agent which does not alter carbon-carbon unsaturation, for example, sodium dithionite or sodium hydrosulfite. See, for example, J. Chem. Soc. (London), 985 (1956); J. Am. Chem. Soc. 79, 1518 (1957); Ber. Deut. Chem. 88, 1306 (1955); ibid. 89, 2799 (1956); ibid. 90, 2272 (1957).

The novel 1,2-dihydro - 1 - hydroxypyrimidines of Formula III wherein $R_5$ is chlorine, bromine, or iodine are produced by the following reaction sequence, wherein $R_1$, X and $n$ are as defined above, and Y is chlorine, bromine, or iodine:

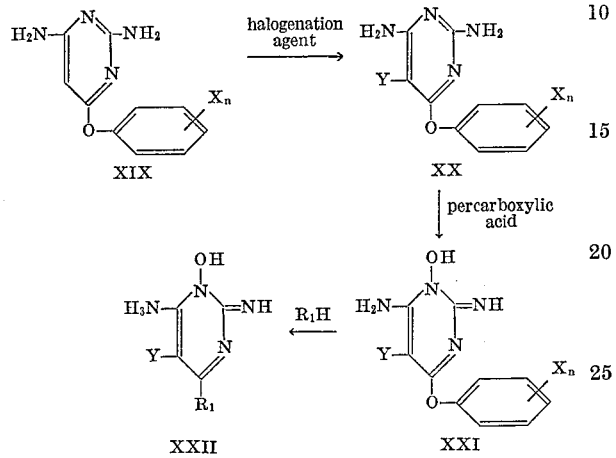

Suitable percarboxylic acids for the transformation of Formula XX pyrimidines to Formula XXI 1,2-dihydro-1-hydroxypyrimidines are those listed above as suitable for the transformation of Formula VII pyrimidines to Formula VI 1,2-dihydro - 1 - hydroxypyrimidines. Especially preferred for this purpose are the above-mentioned perbenzoic acids of Formula VIII. Suitable halogenation agents are the halogens themselves, i.e., chlorine, bromine, and iodine, and the so-called positive halogen compounds.

The term, positive halogen compound, as used herein, refers to organic or inorganic compounds which contains chlorine, bromine, or iodine with a valence number +1. Such compounds usually contain a chlorine, bromine, or iodine atom bonded to some other atom, usually oxygen or nitrogen, in an inorganic or organic compound by a polar covalent bond wherein the halogen atom is the positive end of the dipole. Examples of inorganic positive halogen compounds are the hypohalous acids, e.g., hypochlorous acid and hypobromous acids, and the hypohalites, e.g., lithium, sodium, potassium, and calcium hypochlorites, hypobromites, and hypoiodites. Examples of organic positive halogen compounds are hypohalite esters, e.g., t-butyl hypochlorite; N - haloamides, e.g., N - chloroacetamide, N-bromoacetamide, N-bromobenzamide, N,p - dichloroacetanilide, N - chloro - p - nitroacetanilide, and N-chlorobenzenesulfonamide; N-haloimides, e.g., N-chlorosuccinimide, N-bromosuccinimide, N-iodosuccinimide, N-chlorophthalimide; and other N-halo compounds, e.g., N - bromohydantoin, 1,3-dibromo-5,5-dimethylhydantoin, 1,3 - dichloro-5,5-dimethylhydantoin, and the like. These halogenations are carried out by methods known in the art for halogenation of diaminopyrimidines. See, for example, Brown, "The Pyrimidines," Interscience Publishers, New York, p. 169 (1962) and Phillips et al., J. Am. Chem. Soc., 74, 3922 (1952).

The novel 1,2-dihydro - 1 - hydroxypyrimidines of Formula III wherein $R_5$ is phenylthio, lower-alkylphenylthio, and halophenylthio are produced by mixing a 1,2-dihydro-1-hydroxy-5-halopyrimidine of Formula XXII with a thiophenol of the formula:

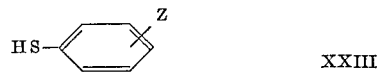

wherein Z is hydrogen, lower alkyl, or halogen, i.e., fluorine, chlorine, bromine, or iodine.

The novel 1,2-dihydro - 1 - hydroxypyrimidines of Formula IV are produced by mixing a 1,2-dihydro-1-hydroxy-5-halopyrimidine of Formula XXII with an amine of the formula $R_6H$, wherein $R_6$ is as defined above.

These last two reactions can be formulated as follows:

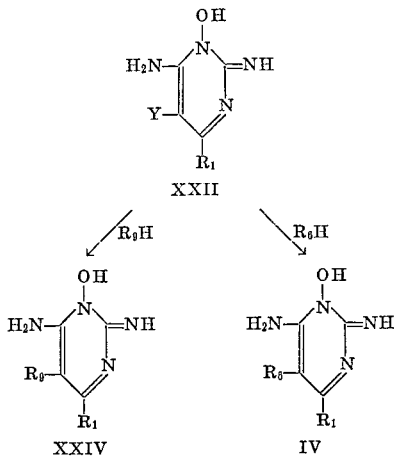

wherein $R_1$, $R_6$ and Y are as defined above, and $R_9$ is selected from the group consisting of phenylthio, lower-alkylphenylthio, and halophenylthio. $R_9H$ represents the same compounds as Formula XXIII. $R_6$ in the amine $R_6H$ can be the same as or different than $R_1$.

The reaction between a Formula IX 2,4-diamino-6-chloropyrimidine and a phenoxide salt of the Formula X phenol is carried out by heating a mixture of the pyrimidine and the salt in the range about 100° to about 200° C., preferably in the range about 140° to about 180° C., until the desired displacement reaction takes places. Usually about one to about 10 hours of heating is sufficient, less time usually being required at 180° C. than at 140° C.

Alkali metal phenoxides, especially sodium or potassium phenoxides, are preferred although phenoxides of other metals, e.g., magnesium, calcium, and aluminum, can be used. One molecular equivalent of the phenoxide salt is required to react with each molecular equivalent of 2,4-diamino-6-chloropyrimidine, and there is usually no reason to use other than those molecular proportions. It is advantageous, however, to heat the phenoxide salt and the 6-chloropyrimidine in the presence of about one to about 10 or even more molecular equivalents of the phenol corresponding to the phenoxide salt. The phenol then serves as a diluent, and can also serve as a source of the phenoxide salt. In the latter case, one molecular equivalent of a metal hydroxide corresponding to the desired metal phenoxide salt, e.g., sodium hydroxide or potassium hydroxide, is added to sufficient Formula X phenol to produce the desired amount of phenoxide salt and leave enough to serve as the diluent.

In preparing the mixture of phenoxide salt and phenol diluent, it is often advantageous to add the metal hydroxide in solid form, and then remove water by a preliminary heating at about 100° C. The chloropyrimidine is then added to the phenoxide-phenol mixture.

Alternatively, chloropyrimidine, metal hydroxide, and sufficient phenol to form phenoxide and to serve as a diluent are mixed together and heated.

In place of or in addition to a phenol diluent, another inert liquid diluent, for example, dimethylformamide, can be used to aid in forming a suitably mobile reaction mixture.

The desired Formula VII 2,4 - diamino - 6 - phenoxypyrimidine can be isolated from the reaction mixture by conventional methods, for example, by addition of sufficient aqueous alkali metal hydroxide solution to dissolve the phenol diluent, if one is used, followed by separation of the desired product by filtration or centrifugation. The phenoxypyrimidine can then be purified, if desired, by conventional methods, for example, by recrystallization from a suitable solvent or mixture of solvents.

The reaction between a Formula VII 2,4-diamino-6-phenoxypyrimidine and a percarboxylic acid to produce a Formula VI 1,2-dihydro-1-hydroxy-4-phenoxypyrimidine is carried out by mixing those two reactants, preferably in the presence of an inert liquid diluent. Although, as mentioned above, percarboxylic acids generally are useful for this oxidation, it is preferred to use perbenzoic acids of Formula VIII. Acids of Formula VIII are known in the art or can be prepared by methods known in the art. See, for example, Braun, Organic Syntheses, Coll. vol. 1, 2d ed., 431 (1941) and Silbert et al., J. Org. Chem. 27, 1336 (1962). In Formula VIII, when $n$ is 2 or more, the Z's can be the same or different. Examples of halogen are fluorine, chlorine, bromine, and iodine. Examples of lower alkyl are methyl, ethyl, propyl, butyl, pentyl, hexyl, heptyl, octyl, and isomeric forms thereof. Examples of lower alkoxy are methoxy, ethoxy, propoxy, butoxy, pentyloxy, hexyloxy, heptyloxy, octyloxy, and isomeric forms thereof. Illustrative oxidizing acids of Formula VIII include perbenzoic acid, o-, m-, and p-chloro- and bromoperbenzoic acids, 3,5 - dichloroperbenzoic acid, 2,3,5,6-tetrachloroperbenzoic acid, 4-methylperbenzoic acid, 3,4 - dimethylperbenzoic acid, pentamethylperbenzoic acid, o-, m-, and p-methoxyperbenzoic acids, 3-nitroperbenzoic acid, 2,4-dinitroperbenzoic acid, 3-chloro-4-methoxyperbenzoic acid, 3-chloro-4-nitroperbenzoic acid, and the like.

In carrying out the reaction between the Formula VII pyrimidine and the Formula VIII perbenzoic acid, the two reactants are mixed advantageously below about 50° C., preferably between about −10° and +10° C., although higher or lower temperatures can be used. It is preferred to mix the reactants in the presence of an inert liquid diluent and to stir the mixture until the reaction is substantially complete. The reaction usually requires about one to about 8 hours. Suitable diluents include N-lower-alkylpyrrolidones, e.g., N-methylpyrrolidone; lower alkanols, e.g., methanol, ethanol, propanol, isopropyl alcohol, the butanols and the pentanols; lower alkanol and glycol esters of lower alkanoic acids, e.g., ethyl acetate, butyl acetate, pentyl acetate, ethylene glycol monoacetate, diethylene glycol monoacetate; ethers, e.g., diethyl ether, diisopropyl ether, ethylene glycol monoethyl ether, diethylene glycol monobutyl ether; and the like. The molecular ratio of Formula VII pyrimidine and Formula VIII perbenzoic acid can be varied widely. Ratios from about 1:1 to 1:5, preferably from about 1:1.5 to 1:2.5, are suitable.

In many cases, Formula VII pyrimidines wherein $R_2$ is lower alkenyl can be oxidized to the corresponding Formula VI 1,2-dihydro-1-hydroxypyrimidines without double bond epoxidation, particularly when the double bonds are part of lower 2-alkenyl groupings. If the double bonds are not resistant to epoxidation, they can be protected before and regenerated after the oxidation. For example, a double bond can be brominated, the compound oxidized, and the double bond regenerated by treatment with zinc metal in a solvent such as ethanol. Alternatively, epoxidation can be allowed to occur and the epoxy group transformed back to a double bond. An example is the procedure of Cornforth et al., J. Chem. Soc. 112 (1959), involving treatment of an epoxide with a mixture of sodium iodide, sodium acetate, zinc, and acetic acid. Other methods of producing Formula VI compounds wherein $R_2$ is lower alkenyl involve starting with Formula VII pyrimidines wherein an $R_2$ carbon atom is attached to a halogen, e.g., bromine or iodine, another carbon atom vicinal to that carbon atom being attached to a lower alkoxy, e.g., methoxy, or to a carboxyl. After the oxidation, the halogen plus lower alkoxy are removed by zinc treatment [Dykstra et al., J. Am. Chem. Soc. 52, 3396 (1930)], or the halogen plus carboxyl are removed by sodium carbonate treatment [Young et al., J. Am. Chem. Soc. 51, 2528 (1929)]. Other methods of protecting, regenerating, or introducing carbon-carbon double bonds to produce desired Formula VI 1,2-dihydro-1-hydroxy-4-phenoxypyrimidines wherein $R_2$ is lower alkenyl will be apparent to those skilled in the art.

The 1,2 - dihydro - 1-hydroxy-4-phenoxypyrimidine of Formula VI can be isolated from the oxidation reaction mixture by conventional techniques, for example, by successive evaporation of the reaction solvent at reduced pressure, solution of the basic Formula VI product in aqueous acid, e.g., hydrochloric acid, removal of undesired water-insoluble reaction products by filtration, neutralization of the acidic filtrate, and isolation of the Formula VI product by filtration, extraction, or chromatography. The isolated material can be purified by conventional techniques, for example, by recrystallization from a suitable solvent or pair of solvents, or by preparation of an acid addition salt, e.g., the hydrochloride or acid phosphate, and recrystallization of the salt, followed, if desired, by reconversion of the salt to the free base in the usual manner.

The reaction between a Formula VI 1,2-dihydro-1-hydroxy-4-phenoxypyrimidine and an amine of formula $R_1H$, wherein $R_1$ is as defined above, to produce a Formula II 1,2-dihydro-1-hydroxypyrimidine is carried out by mixing those two reactants and heating the mixture in the range about 100° to about 200° C., preferably in the range about 125° to about 175° C. At least one molecular equivalent of the amine should be mixed with each molecular equivalent of the pyrimidine reactant. It is usually advantageous to use an excess of the amine, for example, about 2 to about 20 molecular equivalents or even more of amine per molecular equivalent of the pyrimidine, the excess amine then acting as a diluent. An inert organic diluent can also be present in the reaction mixture. Especially suitable for that purpose are dialkylformamides, particularly those where the dialkyl substituents are the same as those on the displacing amine, and alkanols.

When the reactant amine has a relatively low boiling point and is likely to escape from the reaction vessel during heating, it is advantageous to use a closed reaction vessel, for example, a heavy-wall, sealed, glass tube or a closed metal autoclave for the heating step.

A reaction time of about one to about 20 hours is usually required. The desired displacement reaction usually takes place more rapidly at higher temperatures than at lower. Moreover, when the phenoxy moiety has 2 or 3 halogen substituents, i.e., when $n$ in formula VI is 2 or 3, the displacement usually takes place more rapidly and at a lower temperature than when fewer or no halogen is present. In the latter instances, especially when no halogen is present in the phenoxy moiety, the displacement reaction is often accelerated by adding sodium or potassium metal to the reaction mixture. Preferably, about one atomic equivalent of the alkali metal is added per molecular equivalent of the pyrimidine reactant. Addition of a catalytic amount of a Lewis acid such as ferric chloride with the alkali metal will also often accelerate the displacement reaction or make feasible a lower reaction temperature. About 0.01 to 0.001 molecular equivalents of ferric chloride per atomic equivalent of alkali metal is usually a suitable catalytic amount.

Examples of suitable primary amine reactants for this displacement reaction are methylamine, ethylamine, propylamine, isopropylamine, butylamine, sec-butylamine, pentylamine, isopentylamine, hexylamine, heptylamine, octylamine, allylamine, 2-methylallylamine, 2-butenylamine, 3-butenylamine, 3-pentenylamine, 4-hexenylamine, 4,4-dimethyl-2-pentenylamine, cyclobutylamine, cyclohexylamine, 4 - tert - butylcyclohexylamine, benzylamine, phenethylamine, and the like. Examples of suitable secondary amines for this purpose are dimethylamine, diethylamine, N-methylethylamine, dipropylamine, N-ethylisopropylamine, di - sec - butylamine, N - methylbutylamine, dipentylamine, N - ethyl - 2,4 - dimethylpentylamine, N - methyloctylamine, diheptylamine, diallylamine, N - methylallylamine, di - (1 - methylallyl)-amine, di - (2 - methylallyl)amine, N - ethyl - 1 - methylallylamine, N - propyl - 2 - ethylallylamine, di - (2-pentenyl)amine, di - (3 - butenyl)amine, di - (4 - hexenyl)amine, N - butyl - 2 - butenylamine, N - methylcyclohexylamine, dicyclohexylamine, N-ethylbenzylamine, dibenzylamine, di(4 - methyl - 3 - hexenyl)amine, aziridine, 2 - methylaziridine, 2,2 - dimethylaziridine, azetidine, 2 - ethylazetidine, 3 - octylazetidine, 3,3 - dimethylazetidine, 2,2,4 - trimethylazetidine, pyrrolidine, 2 - propylpyrrolidine, 3 - butylpyrrolidine, 2 - isohexylpyrrolidine, 2,3 - dimethylpyrrolidine, 2,2,4 - trimethylpyrrolidine, 2,5 - diethylpyrrolidine, 3,4 - dioctylpyrrolidine, piperidine, 2 - methylpiperidine, 3 - ethylpiperidine, 4-butylpiperidine, 2,4,6 - trimethylpiperidine, 2 - methyl-5 - ethylpiperidine, 3,5 - dipentylpiperidine, hexahydroazepine, 2 - ethylhexahydroazepine, 4 - tert - butylhexahydroazepine, 3,3 - dimethylhexahydroazepine, 2,4,6-tripropylhexahydroazepine, heptamethylenimine, 2-methylheptamethylenimine, 2,4 - diisopropylheptamethylenimine, octamethylenimine, 4 - isooctyloctamethylenimine, morpholine, 2 - ethylmorpholine, 2 - methyl - 5 - ethylmorpholine, 2,6 - dimethylmorpholine, N - methylpiperazine, and the like.

The desired Formula II 1,2-dihydro-1-hydroxypyrimidine can usually be isolated from the reaction mixture in free base form by cooling the reaction mixture to about 0° to about 25° C. The free base form usually precipitates and can be isolated by conventional techniques, for example, by filtration or centrifugation. Alternatively, excess amine and other diluent, if one is used, can be removed by distillation or evaporation, and the desired 1,2-dihydro - 1 - hydroxypyrimidine isolated by conventional techniques, for example fractional recrystallization or extraction. The isolated pyrimidine can then be purified, if desired, by conventional techniques, for example, recrystallization from a suitable solvent or mixture of solvents, or by chromatography. Alternatively, an acid addition salt, e.g., the hydrochloride or acid phosphate of the pyrimidine product can be prepared, purified by recrystallization, and then, if desired, reconverted to the free base in the usual manner.

Nitrosation of the Formula XI 1,2-dihydro-1-hydroxypyrimidines and Formula XIV 1,2-dihydro-1-hydroxy-4-phenoxypyrimidines is advantageously carried out by mixing pyrimidine reactant with a strong acid, and then adding a nitrite salt, preferably sodium nitrite, to the mixture with cooling. Concentrated sulfuric acid is the preferred strong acid. About one molecular equivalent of the nitrile salt should be used for each molecular equivalent of the pyrimidine reactant. A reaction temperature in the range about 0° to about 250 C. is preferred. It is advantageous to add an aqueous solution of the nitrite salt to the acid solution of the pyrimidine.

The desired nitrosation usually takes place within about 15 minutes to about 4 hours in the preferred temperature range. After the nitrosation is complete, the desired nitroso compound can be isolated by diluting the reaction mixture with water and neutralizing the acid with a base, preferably keeping the mixture below about 25° C. by addition of ice. Any base can be used but sodium hydroxide, sodium carbonate, or sodium bicarbonate are preferred. The nitroso product is usually a solid and can be isolated by conventional methods, for example, by filtration or centrifugation, and can be purified, if desired, by recrystallization from a suitable solvent or mixture of solvents.

Nitration of the Formula XI 1,2-dihydro-1-hydroxypyrimidines and Formula XIV 1,2-dihydro-1-hydroxy-4-phenoxypyrimidines is advantageously carried out by mixing the pyrimidine reactant with concentrated sulfuric acid (95%), cooling the resulting solution, and then slowly adding a mixture of concentrated sulfuric acid (95%) and concentrated nitric acid (70%) with continued cooling in the range about 0° to about 25° C., preferably about 10° to 15° C. A total reaction time of about one to about 5 hours is usually sufficient. One molecular equivalent of nitric acid is required for each molecular equivalent of pyrimidine reactant unless it is desired or expected that a phenoxy moiety will be nitrated in a Formula XIV 1,2 - dihydro-1-hydroxy-4-phenoxypyrimidine. In that case two molecular equivalents of nitric acid should be used. There is usually no reason to use larger amounts of nitric acid.

In some instances, a less concentrated sulfuric acid or less concentrated nitric acid can be used if the pyrimidine reactant is especially easily nitrated. It is also advantageous to do that when it is desired to avoid nitration of the phenoxy moiety of a Formula XIV pyrimidine reactant or an $R_2$ substituent, for example, an alkenyl moiety. It will be apparent to those skilled in the art that the optimum nitration conditions for each paricular pyrimidine reactant of Formula XI or Formula XIV, including nitric acid and sulfuric acid concentrations and amounts, reaction time, and reaction temperature must be determined by preliminary small scale experiments.

The nitrated 1,2-dihydro-1-hydroxypyrimidine of Formula XII or XV can be isolated for the reaction mixture by pouring the mixture onto crushed ice, making the resulting mixture basic, and then isolating the desired nitration product by conventional methods, for example, filtration, centrifugation, or extraction. The nitration products are usually solids and can be purified by recrystallization from a suitable solvent or mixture of solvents or by chromatography.

Reduction of the Formula XII of Formula XV 1,2-dihydro-1-hydroxy-5-nitropyrimidines and reduction of the Formula XIII or Formula XVI 1,2-dihydro-1-hydroxy-5-nitrosopyrimidines is advantageously carried out by catalytic hydrogenation in the presence of a hydrogenation catalyst, for example, a noble metal, e.g., platinum, palladium, rhodium, or a base metal, e.g., Raney nickel, Raney cobalt, and in the presence of an inert diluent, for example, methanol, ethanol, dioxane, ethyl acetate, and the like. Palladium catalysts are preferred. Hydrogenation pressures ranging from about atmospheric to about 100 p.s.i., and hydrogenation temperatures ranging from about 10° to about 100° C. are preferred.

It is also preferred to add sufficient strong acid, for example, a mineral acid such as hydrochloric acid, sulfuric acid, or phosphoric acid, to the pyrimidine reactant before hydrogenation so that the protonated form of the reactant is hydrogenated and the protonated or acid addition salt form of the 5-aminopyrimidine product is produced. In some instances, the acid addition salt form of the product is substantially more stable and more easily isolated than the free base form.

The Formula XVII and Formula XVIII 5-aminopyrimidine reduction products are isolated from the hydrogenation reaction mixtures by conventional techniques, for example, by removal of the catalyst by filtration or centrifugation, and then removal of the diluent by distillation or evaporation. If the 5-nitropyrimidine or 5-nitrosopyrimidine reactant is pure, it is usually unnecessary to purify the 5-aminopyrimidine product. When purification is necessary, however, it is preferred to purify a suitable acid addition salt by recrystallization from a suitable solvent or mixture of solvents.

Halogenation of Formula XIX 2,4-diamino-6-phenoxypyrimidines is carried out by mixing the pyrimidine reactant with the halogenating agent, preferably in the presence of a diluent. For example, in the case of bromination, the pyrimidine reactant is dissolved in a diluent such as acetic acid, and the resulting solution is gradually mixed in the range about 10° to about 100° C. with one molecular equivalent of bromine, also dissolved in a diluent such as acetic acid. In some instances, it is advantageous to carry out the bromination in the presence of water, although enough organic diluent, e.g., acetic acid, should also be present to maintain a homogeneous reaction mixture. The presence of a base such as calcium carbonate, or sodium acetate where the diluent is acetic acid, to neutralize the hydrobromic acid which is formed is also desirable. In a similar manner, use of chlorine and iodine yields the corresponding Formula XX 5-chloropyrimidines and 5-iodopyrimidines, respectively. In the case of iodination with iodine, it is advantageous to have present at least one molecular equivalent of a mercuric compound such as mercuric acetate to remove the hydrogen iodide which is formed.

Alternatively, one of the so-called positive halogen compounds, examples of which have been given above, can be used to halogenate a Formula XIX 2,4-diamino-6-phenoxypyrimidine. For example, a mixture of a Formula XIX pyrimidine reactant, one molecular equivalent of the positive halogen compound, e.g., N-chlorosuccinimide, N-bromosuccinimide, or N-iodosuccinimide, and an inert diluent, for example, carbon tetrachloride, are mixed and heated in the range about 50° to about 100° C.

The desired 2,4-diamino-5-halo-6-phenoxypyrimidines of Formula XX can be isolated from a halogenation reaction mixture by conventional methods, for example, by evaporation of the diluent, and the product can be purified, if desired, by conventional methods, for example, by recrystallization from a suitable solvent or mixture of solvents, or by chromatography.

Oxidation of the Formula XX 2,4-diamino-5-halo-6-phenoxypyrimidine with a percarboxylic acid to produce a Formula XXI 1,2-dihydro-1-hydroxy-5-halo-6-phenoxypyrimidine is carried out in the same manner described above for the percarboxylic acid oxidation of Formula VII 2,4-diamino-6-phenoxypyrimidines to Formula VI 1,-2-dihydro-1-hydroxy-4-phenoxypyrimidines.

The displacement of phenoxy moieties in Formula XV 1,2-dihydro - 1 - hydroxy-5-nitro-4-phenoxypyrimidines, Formula XVI 1,2-dihydro-1-hydroxy-5-nitroso-4-phenoxypyrimidines, Formula XVIII 1,2 - dihydro-1-hydroxy-5-amino-4-phenoxypyrimidines, and Formula XXI 1,2-dihydro-1-hydroxy-5-halo-4-phenoxypyrimidines with primary and secondary amines of the Formula $R_1H$, wherein $R_1$ is as defined above, is carried out as described above for the displacement of phenoxy moieties from Formula VI 1,2-dihydro-1-hydroxy-4-phenoxypyrimidines with primary and secondary amines of the same Formula $R_1H$, and the resulting products are isolated and purified in the manner also described above. The displacement of phenoxy in Formula XXI compounds is especially rapid and can be carried out in the range about 0° to 100° C., preferably about 20° to about 50° C.

The reaction between a Formula XXII 1,2-dihydro-1-hydroxy - 5 - halopyrimidine and a thiophenol of Formula XXIII to produce a Formula XXIV 1,2-dihydro-1-hydroxy - 5 - arylthiopyrimidine is advantageously carried out by heating a mixture of those two reactants in the presence of a strong base, preferably an alkali metal hydroxide such as sodium hydroxide or potassium hydroxide, in the range about 50° to about 200° C., preferably in the range about 75° to about 125° C., until the desired displacement of halogen takes place. For this displacement, it is preferred that the displaced halogen be bromine, i.e., that Y in Formula XXII be bromine. It is also preferred that an excess of the Formula XXIII thiophenol be used, preferably about 2 to about 10 or even more molecular equivalents of thiophenol per molecular equivalent of the pyrimidine reactant. It is also preferred that about one molecular equivalent of the strong base be used per molecular equivalent of the pyrimidine reactant. A reaction time of about 1 to about 10 hours is usually required in the preferred temperature range. It is usually advantageous to add a small amount of water, preferably about 5 to about 25 percent by weight of the base used, to aid in forming a homogeneous reaction mixture. An inert diluent of appropriate boiling point can also be added for that purpose.

The desired Formula XXIV 1,2-dihydro-1-hydroxy-5-arylthiopyrimidine can be isolated from the reaction mixture by diluting said mixture with water containing enough alkali metal hydroxide to dissolve the excess thiophenol. The remaining desired product is usually a solid which can be separated by conventional methods, for example, by filtration, centrifugation, or extraction, and can usually be purified, if desired, by recrystallization from a suitable solvent or mixture of solvents.

The reaction between a Formula XXII 1,2-dihydro-1-hydroxy - 5 - halopyrimidine and a primary or secondary amine of the formula $R_6H$ to produce a Formula IV 1,2 - dihydro - 1 - hydroxy - 5 - substituted - aminopyrimidine is advantageously carried out by heating a mixture of those two reactants in the range about 90° to about 150° C., preferably in the range about 105° to about 115° C. The reaction conditions and manipulations are otherwise similar to the above-described displacement of the phenoxy moiety of a Formula VI 1,2-dihydro - 1 - hydroxy - 4 - phenoxypyrimidine with an amine of the Formula $R_1H$. At least one molecular equivalent of the displacing amine should be used. Preferably about 2 to about 10 molecular equivalents is used so that the excess amine acts as a diluent which results in a homogeneous reaction mixture. Although any of the halogens within the scope of Formula XXII can be displaced with an amine, it is preferred that the displaced halogen be bromine.

Examples of suitable amines for this halogen displacement are those listed above as suitable for the phenoxy displacement. A closed reaction vessel is preferred when using those amines whose boiling point at atmospheric pressure is lower than the desired reaciton temperature.

The desired Formula IV 1,2-dihydro-1-hydroxy-5-substituted - aminopyrimidine can be isolated from the reaction mixture by evaporating excess amine and diluent, if one is used, followed by treatment with dilute aqueous base to transform any amine salts to the free base form. The crude amine product is then purified by distillation at reduced pressure, recrystallization from a suitable solvent or mixture of solvents, or chromatography, or by a combination of those methods.

The 1,2 - dihydro - 1 - hydroxypyrimidines of Formulas I, II, III and IV are transformed to monoacid and diacid addition salts by neutralization with appropriate amounts of the corresponding inorganic or organic acid, examples of which are given above. These transformations can be carried out by a variety of procedures known to the art to be generally useful for the preparation of amine acid addition salts. The choice of the most suitable procedure will depend on a variety of factors including convenience of operation, economic considerations, and particularly the solubility characteristics of the Formula I, II, III or IV amine, the acid, and the acid addition salt. If the acid is soluble in water, the basic compound of Formula I, II, III or IV can be dissolved in water containing either one or two equivalent amounts of the acid, and thereafter, the water can be removed by evaporation. If the acid is soluble in a relatively nonpolar solvent, for example, diethyl ether or diisopropyl ether, separate solutions of the acid and the basic Formula I, II, III or IV compound in such a solvent can be mixed in equivalent amounts, whereupon the acid addition salt will usually precipitate because of its relatively low solubility in the nonpolar solvent. Alternatively, the basic Formula I, II, III or IV compound can be mixed with the acid in the presence of a solvent of moderate polarity, for example, a lower alkanol, a lower alkanone, or a lower alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. Either monoacid or diacid salts can be formed by using one or two equivalents, respectively, of the acid.

Acid addition salts of the Formula I, II, III or IV pyrimidines can be transformed to other acid addition salts by a metathetical exchange of the original acid addition salt anion, e.g., the chloride ion, with another anion, for example, as described above with regard to the formation of penicillin salts.

The carboxyacylates of Formula V are produced by mixing a Formula I, II, III or IV 1,2-dihydro-1-hydroxypyrimidine with the appropriate amount of a carboxyacylating agent, preferably in the presence of a diluent.

Although substantially any carboxyacylating agent can be used to produce these carboxyacylates, especially suitable are the anhydrides, mixed anhydrides, and acid chlorides of alkanoic, cycloalkanoic, alkenoic, cycloalkenoic, aralkanoic, aromatic, and heterocyclic carboxylic acids. These anhydrides and acid chlorides can also be substituted on any carbon but the carbonyl carbon with any of a wide variety of atomic or molecular moieties unreactive with the dihydropyrimidine reactants. Examples of such substituents are alkyl, e.g., methyl, butyl, decyl; alkoxy, e.g., methoxy, ethoxy, pentyloxy; alkylthio, e.g., methylthio, propylthio, heptylthio; dialkylamino, e.g., dimethylamino, diethylamino, dihexylamino; alkoxycarbonyl, e.g., methoxycarbonyl, propoxycarbonyl, nonoxycarbonyl; carboxyacyl, e.g., acetyl, butyryl; carboxamido, e.g., benzamido, acetamido; nitro; fluoro; cyano; and the like. Chlorine, bromine, and iodine can also be substituents on aromatic portions of the carboxy-acylating agents.

Examples of suitable anhydrides are acetic anhydride, propionic anhydride, butyric anhydride, isobutyric anhydride, acrylic anhydride, crotonic anhydride, cyclohexanecarboxylic anhydride, benzoic anhydride, naphthoic anhydride, furoic anhydride, and the like, as well as the corresponding anhydrides substituted with one or more of the above-mentioned substituents. Examples of suitable acid chlorides are acetyl chloride, propionyl chloride, butyryl chloride, isobutyryl chloride, decanoyl chloride, acryloyl chloride, crotonoyl chloride, cyclohexanecarbonyl chloride, 3-cyclohexenecarbonyl chloride, phenylacetyl chloride, succinyl chloride, benzoyl chloride, naphthoyl chloride; furoyl chloride, 3-pyridinecarbonyl chloride, phthaloyl chloride, and the like, as well as the corresponding acid chlorides substituted with one or more of the above-mentioned substituents.

At least one molecular equivalent of carboxyacylating agent should be used for the introduction of each carboxyacyl moiety. When reactive carboxyacylating agents such as acetic anhydride are used, a diacyl compound is usually obtained even with only one molecular equivalent of carboxyacylating agent. In such cases, part of the dihydropyrimidine reactant does not form a carboxyacylate.

The carboxyacylation usually takes place rapidly in the range about −20° to about +50° C. Suitable diluents are ethers, e.g., diethyl ether and tetrahydrofuran; ketones, e.g., acetone and methyl ethyl ketone; esters, e.g., methyl acetate and ethyl acetate; acetonitrile; pyridine; and the like. The desired carboxyacylate often separates from the reaction mixture in crystalline form, and can be separated in the usual manner, for example, by filtration or centrifugation. Alternatively, the diluent can be evaporated, preferably at reduced pressure. The carboxyacylates can be purified by conventional techniques, for example, by recrystallization from a suitable solvent or mixture of solvents.

The nature of each carboxyacylate depends on such factors as the nature of the dihydropyrimidine reactant, the nature and amount of carboxyacylating agent, the reaction time, and the reaction temperature. Usually a monoacylate or a diacylate, or a mixture of those, is obtained, although the formation of a triacylate is observed in some instances. The monoacylates are usually N-acyl compounds. The diacylates are either N,N'-diacyl or O,N-diacyl compounds. Use of the more reactive acylating agents, e.g., acetic anhydride, often results in N,N'-diacylates. The less reactive agents, e.g., benzoic anhydride, usually given N-acylates and/or O,N-diacylates.

Carboxyacylates produced at relatively low temperatures, i.e., about −20° to about 0° C. and with relatively short reaction times, i.e., a few seconds to about 10 minutes, usually contain larger amounts of N-monoacylate and O,N-diacylate, and less N,N-diacylate, than those produced at higher temperatures, i.e., about 10° C. to about 50° C. and with longer reaction times, i.e., about 30 minutes to 100 hours.

Dihydropyrimidine carboxyacylates prepared as described above are easily transformed back to the Formula I, II, III or IV dihydropyrimidine free base, preferably by warming with a lower alkanol, e.g., methanol or ethanol. Simultaneous treatment with a base, for example, gaseous ammonia, or an acid, for example, hydrochloric acid, usually accelerates the alcoholysis.

As mentioned above, the novel compounds of this invention, i.e., compounds of Formulas I, II, III, IV, V and VI, including the free bases and acid addition salts thereof, are useful as antihypertensive agents, antifertility agents, antiviral agents, antiinflammatory agents, and as central nervous system stimulants in the treatment of birds and mammals, including man. For those purposes, especially as antihypertensive agents, said novel compounds can be used in the nonprotonated (free base) form or in the protonated (acid addition salt) form either in association with a pharmaceutical carrier in solid or liquid dosage forms, such as tablets, capsules, powders, pills, granules, syrups, elixirs, suppositories, sterile aqueous or vegetable oil dispersions for parenteral use, and the like, alone or in combination with other drugs, for example, in combination with diuretics, sympathetic blocking agents, ganglion-blocking agents, peripheral vasodilators, reserpinoids, tranquilizers, sedatives, muscle relaxants, antihistamines and other antihypertensives.

Powders are prepared by comminuting the active ingredient to a suitable fine size and mixing with a similarly comminuted diluent. The diluent can be an edible carbohydrate material such as starch. Advantageously, a sweetening agent is present as well as a flavoring agent.

Capsules are produced by preparing a powder mixture as hereinbefore described and filling into formed gelatin sheets. Advantageously, as an adjuvant to the filling operation, a lubricant such as talc, magnesium stearate and calcium stearate is added to the powder mixture before the filling operation.

Tablets are made by preparing a powder mixture, granulating or slugging, adding a lubricant and pressing into tablets. The powder mixture is prepared by mixing the active ingredient suitably comminuted, with a diluent or base such as starch, lactose, kaolin, dicalcium phosphate, calcium sulfate, and the like. The powder mixture can be granulated by wetting with a binder such as syrup, gelatin solution, methylcellulose solution or acacia mucilage and forcing through a screen. As an alternative to wet granulating, the powder mixture can be slugged, i.e., run through a tablet machine and the resulting large tablets broken down into granules. The granules are further lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of active ingredient for administration.

A syrup is prepared by dispersing the active ingredient in a suitably flavored aqueous sucrose solution. Similarly an elixir is prepared utilizing an aqueous-alcoholic vehicle. Elixirs are advantageous vehicles for use when a therapeutic agent, which is not sufficiently water-soluble, is in the composition.

For parenteral administration aqueous fluid unit dosage forms can be prepared. In preparing the parenteral form, a measured amount of active ingredient is placed in a vial, and the vial and its contents are sterilized and sealed. An accompanying vial of sterile water for injection is provided as a vehicle to form a dispersion prior to administration. Advantageously, the sterile water can have dissolved therein a local anesthetic and buffering agent. Parenteral aqueous solutions can also be made by utilizing a pharmacologically acceptable salt of the active ingredient, such as those mentioned above.

Alternatively, a parenteral suspension can be prepared by suspending the active ingredient in a parenterally acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in the specification, these being features of the present invention. Examples of suitable unit dosage forms in accord with this invention are tablets, capsules, pills, powder packets, granules, wafers, cachets, suppositories, segregated multiples of any of the foregoing, and other forms as herein described.

The amount of active ingredient that is to be administered depends on the age, weight of the patient, the particular condition to be treated, the frequency of administration, and the route of administration. The dose range is from about 0.1 to about 30 mg. per kg. of body weight, preferably about 0.3 to about 10 mg. per kg. of body weight. The human dose ranges from amout 5 to about 500 mg. daily given as a single dose or in 3 or 4 divided doses; preferably, the adult dose is from 25 to about 200 mg. Veterinary dosages will correspond to human dosages with amounts administered being in proportion to the weight of the animal as compared to adult humans.

The active ingredient is compounded with a suitable pharmaceutical diluent in unit dosage form, either alone or in combination with other active ingredients. The amount of such other active ingredients is to be determined with reference to the usual dosage of each such ingredient. Thus the novel compounds of the invention can be combined with other hypotensive agents such as α-methyldopa 100–250 mg.; with diuretics such as aminophylline 100–200 mg., bendroflumethiazide 2.5–5 mg., hydrochlorothiazide 10–50 mg., trichloromethiazide 2–4 mg., triamterene 25–100 mg., ethoxzolamide 50–250 mg., amisometradine 200–400 mg., spironolactone 25–100 mg.; sympathetic blocking agents such as guanethidine sulfate 10–50 mg., bethanidine sulfate 5–20 mg. ganglion-blocking agents such as pentolinium bitartrate 20–200 mg., mecamylamine hydrochloride 2.5-5 mg., hexamethonium chloride 125–250 mg., chlorisondamine chloride 25–100 mg.; peripheral vasodilators such as hydralazine 10–100 mg., beta-pyridyl carbinol 50–150 mg., mebutamate 100–300 mg.; reserpine type drugs such as reserpine 0.1–1 mg., alseroxylon 2–4 mg., syrosingopine 0.5–2 mg., deserpidine 0.1–1 mg.; tranquilizers such as meprobamate 200–400 mg., ectylurea 100–300 mg., chlordiazepoxide hydrochloride 5–20 mg., promazine hydrochloride 25–150 mg., diazepan 2–10 mg.; sedatives such as phenobarbital 8–60 mg., methyprylon 50–100 mg., amobarbital 20–40 mg., ethchlorvynol 100–200 mg.; muscle relaxants such as papaverine hydrochloride 20–100 mg., carisoprodol 200–400 mg., phenaglycodol 200–400 mg.

The invention can be more fully understood by the following examples.

Example 1.—2,4-diamino-6-(2,4-dichlorophenoxy) pyrimidine

A mixture of 2,4-diamino-6-chloropyrimidine (28.6 g.), potassium hydroxide (13.2 g. of 85%), and 2,4-dichlorophenol (163 g.) was heated at 150° C. for 3 hours. The resulting mixture was cooled to 110° C., and then mixed with a solution of potassium hydroxide (60 g.) in 1000 ml. of water. After gradual cooling to 25° C., the mixture was filtered, and the filter cake was washed thoroughly with water, and then dissolved in ethanol. The ethanol solution was boiled with decolorizing carbon (Nuchar 150–N) and then filtered. The filtrate was heated to boiling and diluted with enough water to give 35% aqueous ethanol. After cooling externally with ice for 5 hours, the mixture was filtered to give 31 g. of a solid which was recrystallized from acetonitrile to give 21 g. of 2,4-diamino-6-(2,4-dichlorophenoxy)pyrimidine; M.P. 187–188° C.

*Analysis.*— Calcd. for $C_{10}H_8Cl_2N_4O$: C, 44.30; H, 2.97; N, 20.67; O, 5.90; Cl, 26.15. Found: C, 45.12; H, 3.93; N, 20.12; O, 4.39; Cl, 25.96.

U.V. ($C_2H_5OH$): sh. 226 m$\mu$ ($\epsilon$=16,680); 269 m$\mu$ ($\epsilon$=9680). (0.01 N $H_2SO_4$): sh. 224 m$\mu$ ($\epsilon$=16,610); 284 m$\mu$ ($\epsilon$=16,610). (0.01 N KOH): sh. 226 m$\mu$ ($\epsilon$=17,900); 270 m$\mu$ ($\epsilon$=10,390).

I.R. (principal bands; mineral oil mull): 3480, 3370, 3300, 3140, 1670, 1625, 1545, 1570, 1230, 1195, 1100, 1050, 1010, 795, 755 cm.$^{-1}$.

Example 2.—2,4-diamino-6-(2,4-dichlorophenoxy) pyrimidine 2,4-dichlorophenol (244 g.) was melted and mixed with potassium hydroxide (28 g. of 85%). The mixture was heated at 110° F. for 15 minutes to remove water. 2,4-diamino-6-chloropyrimidine (90 g.) was then added gradually with stirring, and the resulting mixture was heated to 165° C. and maintained in the range 165° to 170° C. for 3.5 hours. The reaction mixture was then cooled to 110° C. and mixed with a solution of potassium hydroxide (62 g.) in 2000 ml. of water. The resulting mixture was stirred for 15 minutes and then cooled slowly to 30° C. during 2 hours. Filtration gave a solid which was thoroughly washed with water and air dried. The dried solid was dissolved in 1000 ml. of ethanol, and the solution was refluxed 20 minutes with decolorizing carbon (Nuchar 190–N) and filtered. The solution was then mixed with an equal volume of water and allowed to stand at about 25° C. for 15 hours. The resulting solid was filtered to give 61 g. of 2,4-diamino-6-(2,4-dichlorophenoxy)pyrimidine; M.P. 187–188° C.

Example 3.—2,4-diamino-6-(2,4,6-trichlorophenoxy)pyrimidine

A mixture of 2,4-diamino-6-chloropyrimidine (57.2 g.), potassium hydroxide (26.4 g. of 85%), and 2,4,6-trichlorophenol (236 g.) was heated at 155° C. for 3 hours. The resulting mixture was cooled to 100° C., and then mixed with a solution of potassium hydroxide (56 g.) in 2000 ml. of water. After gradual cooling to 25° C., the mixture was filtered, and the filter cake was washed six times with 250-ml. portions of water, and then dissolved in 800 ml. of ethanol. The solution was boiled with decolorizing carbon (Nuchar 190–N) and filtered. The filtrate was diluted with an equal volume of water. Cooling and filtration gave 66.9 g. of 2,4-diamino-6-(2,4,6-trichlorophenoxy)pyrimide; M.P. 163–165° C.

*Analysis.*—Calcd. for $C_{10}H_7Cl_3N_4O$: C, 39.31; H, 2.31; N, 18.34; O, 5.24; Cl, 34.81. Found: C, 39.41; H, 2.28; N, 17.96; O, 4.10; Cl, 34.37.

U.V. ($C_2H_5OH$): sh. 226 m$\mu$ ($\epsilon$=20,300); 269 m$\mu$ ($\epsilon$=10,200). (0.01 N $H_2SO_4$): 226 m$\mu$ ($\epsilon$=20,950); 285 m$\mu$ ($\epsilon$=18,150). (0.01 N KOH): 226 m$\mu$ ($\epsilon$=20,950); 269 m$\mu$ ($\epsilon$=10,900).

I.R. (principal bands; maneral oil mull): 3500, 3390, 3340, 3170, 3130, 1650, 1615, 1590, 1565, 1240, 1175, 1140, 1050, 865, 860, 855 cm.$^{-1}$.

Following the procedure of Example 1 but using in place of the 2,4-dichlorophenol, phenol; p-chlorophenol; p-bromophenol; 2,4-dibromophenol; and m-fluorophenol, there are obtained 2,4-diamino - 6 - phenoxypyrimidine; 2,4-diamino - 6 - (p - chlorophenoxy)pyrimidine; 2,4-diamino - 6 - (p-bromophenoxy)pyrimidine; 2,4-diamino-6-(2,4-dibromophenoxy)pyrimidine; and 2,4-diamino-6-(m-fluorophenoxy)pyrimidine, respectively.

Also following the procedure of Example 1 but using in place of the 2,4-diamino-6-chloropyrimidine, 2,4-diamino-6-chloro-5-methylpyrimidine;
2,4-diamino-5-butyl-6-chloropyrimidine;
2,4-diamino-6-chloro-5-isooctylpyrimidine;
2,4-diamino-5-allyl-6-chloropyrimidine;
2,4-diamino-6-chloro-5-crotylpyrimidine;
2,4-diamino-6-chloro-5-(2-hexenyl)pyrimidine;
2,4-diamino-6-chloro-5-(2-methoxyethyl)pyrimidine;
2,4-diamino-6-chloro-5-cyclopentylpyrimidine;
2,4-diamino-6-chloro-5-(4-tert-butylcyclohexyl)pyrimidine;
2,4-diamino-6-chloro-5-phenylpyrimidine;
2,4-diamino-6-chloro-5-(p-tolyl)pyrimidine;
2,4-diamino-6-chloro-5-(p-tert-butylphenyl)pyrimidine;
2,4-diamino-5-benzyl-6-chloropyrimidine;
2,4-diamino-6-chloro-5-(4-phenylbutyl)pyrimidine;
2,4-diamino-6-chloro-5-(o-methylbenzyl)pyrimidine;
2,4-diamino-6-chloro-5-(4-methyl-1-naphthylmethyl)pyrimidine;
2,4-diamino-6-chloro-5-(m-methoxybenzyl)pyrimidine;
and 2,4-diamino-6-chloro-5-(p-bromobenzyl)pyrimidine, there are obtained 2,4-diamino-6-(2,4-dichlorophenoxy)-5-methylpyrimidine;
2,4-diamino-5-butyl-6-(2,4-dichlorophenoxy)pyrimidine;
2,4-diamino-6-(2,4-dichlorophenoxy)-5-isooctylpyrimidine;
2,4-diamino-5-allyl-6-(2,4-dichlorophenoxy)pyrimidine;
2,4-diamino-6-(2,4-dichlorophenoxy)-5-crotylpyrimidine;
2,4-diamino-6-(2,4-dichlorophenoxy)-5-(2-hexenyl)pyrimidine;
2,4-diamino-6-(2,4-dichlorophenoxy)-5-(2-methoxyethyl)pyrimidine;
2,4-diamino-6-(2,4-dichlorophenoxy)-5-cyclopentylpyrimidine;
2,4-diamino-6-(2,4-dichlorophenoxy)-5-(4-tert-butylcyclohexyl)pyrimidine;
2,4-diamino-6-(2,4-dichlorophenoxy)-5-phenylpyrimidine;
2,4-diamino-6-(2,4-dichlorophenoxy)-5-(p-tolyl)pyrimidine;
2,4-diamino-6-(2,4-dichlorophenoxy)-5-(p-tert-butylphenyl)pyrimidine;
2,4-diamino-5-benzyl-6-(2,4-dichlorophenoxy)pyrimidine;
2,4-diamino-6-(2,4-dichlorophenoxy)-5-(4-phenylbutyl)pyrimidine;
2,4-diamino-6-(2,4-dichlorophenoxy)-5-o-methylbenzyl)pyrimidine;
2,4-diamino-6-(2,4-dichlorophenoxy)-5-(4-methyl-1-naphthylmethyl)pyrimidine;
2,4-diamino-6-(2,4-dichlorophenoxy)-5-(m-methoxybenzyl)pyrimidine; and
2,4-diamino-6-(2,4-dichlorophenoxy)-5-(p-bromobenzyl)pyrimidine, respectively.

Also following the procedure of Example 1 but using in place of the combination of the 2,4-diamino-6-chloropyrimidine and the 2,4-dichlorophenol, each of the specific 2,4 - diamino-5-substituted - 6 - chloropyrimidines mentioned above and each of the specific halophenols mentioned above, there are obtained the corresponding 2,4 - diamino - 5 - substituted - 6 - phenoxypyrimidines and 2,4 - diamino - 5 - substituted - 6 - halophenoxypyrimidines. Also following the procedure of Example 1 but using in place of the 2,4-diamino-6-chloropyrimidine, a 2,4-diamino-6-chloropyrimidine substituted at the 5-position separately with each of the specific examples of $R_2$ mentioned above, i.e., each of the specific examples of lower alkyl, lower alkenyl, lower alkoxyalkyl, lower cycloalkyl, lower aryl, lower aralkyl, lower alkaryl, lower alkaralkyl, lower alkoxyaralkyl, and lower haloaralkyl, there are obtained the corresponding 2,4-diamino-5-substituted - 6 - (2,4-dichlorophenoxy)pyrimidines. Also following the procedure of Example 1 but using in place of the combination of the 2,4-diamino-6-chloropyrimidine and the 2,4-dichlorophenol, a 2,4-diamino-6-chloropyrimidine substituted at the 5-position separately with each of the specific examples of $R_2$ mentioned above and, separately, phenol and each of the specific halophenols mentioned above, there are obtained the corresponding 2,4 - diamino - 5 - substituted - 6 - phenoxypyrimidines and 2,4 - diamino - 5 - substituted - 6 - halophenoxypyrimidines.

Example 4.—6-amino-4-(2,4-dichlorophenoxy)1,2-dihydro-1-hydroxy-2-iminopyrimidine A mixture of 2,4-diamino-6-(2,4-dichlorophenoxy)pyrimidine (13.5 g.) and 200 ml. of ethanol was heated until a clear solution was obtained. That solution was then cooled rapidly to 0° C., and to the cold solution m-chloroperbenzoic acid (11.9 g.) was added gradually during 2 hours, keeping the mixture below 5° C. by external cooling with ice. The resulting reaction mixture was then stirred for an additional 4 hours and filtered. The filtrate was mixed with a solution of potassium hydroxide (60 g. of 85%) in 800 ml. of water, and was cooled to 0° C. and maintained there for 1.5 hours. The solid which formed was filtered and recrystallized from acetonitrile to give 3.1 g. of 6-amino-4-(2,4-dichlorophenoxy) - 1,2-dihydro-1-hydroxy - 2 - iminopyrimidine; M.P. 191–193° C.

U.V. (ethanol): 226 m$\mu$ ($\epsilon$=41,600); 278 m$\mu$ ($\epsilon$=6390). (0.01 N $H_2SO_4$): sh. 226 m$\mu$ ($\epsilon$=14,280); 280 m$\mu$ ($\epsilon$=15,600). (0.1 N KOH) 226 m$\mu$ ($\epsilon$=41,100); 278 m$\mu$ ($\epsilon$=6,290).

I.R. (principal bands; mineral oil mull): 3400, 3340, 3300, 3220, 3200, 1640, 1655, 1615, 1595, 1555, 1475, 1210, 1100, 1060, 1000, 790 cm.$^{-1}$.

Addition of absolute ethanol containing one equivalent of hydrogen chloride to an absolute ethanol solution of 6-amino-4-(2,4-dichlorophenoxy)-1,2-dihydro-1-hydroxy-2-iminopyrimidine, followed by addition of about 4 volumes of diethyl ether, gives the corresponding 1,2 - dihydro-1-hydroxypyrimidine monohydrochloride. Similar separate use of benzoic acid, lactic acid, maleic acid, phosphoric acid, sulfuric acid, and succinic acid gives the corresponding 1,2-dihydro-1-hydroxypyrimidine acid addition salts.

Example 5.—6-amino-4-(2,4-dichlorophenoxy)-
1,2-dihydro-1-hydroxy-2-iminopyrimidine A mixture of 2,4-diamino-6-(2,4-dichlorophenoxy)pyrimidine (54.2 g.) and 500 ml. of ethanol (3A denatured) was heated until a clear solution was obtained. Ethylene glycol (300 ml.) was then added, and the mixture was cooled to 0° C. To the cold solution, m-chloroperbenzoic acid (69.2 g.) was added gradually during 1.5 hours, keeping the mixture in the range 0° to 10° C. during the addition. The resulting mixture was stirred for 4 hours in the range 0° to 10° C., and was then filtered into a solution of potassium hydroxide (25 g. of 85%) in 4000 ml. of water. The resulting combined filtrate and solution was allowed to stand for 4 hours at about 25° C., and was then filtered to give a solid which was washed with water and air dried. The dried solid was dissolved in 1500 ml. of boiling acetonitrile. That solution was filtered and cooled to 25° C. The resulting solid was filtered to give 10.6 g. of 6-amino-4-(2,4-dichlorophenoxy) - 1,2 - dihydro-1-hydroxy-2-iminopyrimidine; M.P. 191–193° C.

Example 6.—6-amino-4-(2,4-dichlorophenoxy)-
1,2-dihydro-1-hydroxy-2-iminopyrimidine A mixture of 2,4-amino-6 - (2,4 - dichlorophenoxy)pyrimidine (54.2 g.) and 500 ml. of methanol was heated until a clear solution was obtained. That solution was cooled to 0° C., and m-chloroperbenzoic acid (69.2 g.) was added in small portions during 1.5 hours, keeping the mixture at about 5° C., and adding an equivalent amount of sodium methoxide in methanol (25% solution) after each such addition. The resulting mixture was stirred for 1.5 hours and filtered. The solid filter cake was washed with 100 ml. of methanol, and the combined filtrate and washings were concentrated by evaporation under reduced pressure to 300 ml. That solution was mixed with 1500 ml. of water, and the mixture was cooled at 5° C. for 3 hours, and was then filtered. The filter cake was 22.6 g. of 6-amino-4-(2,4-dichlorophenoxy)-1,2-dihydro-1-hydroxy-2-iminopyrimidine; M.P. 191–193° C.

Example 7.—6-amino-4-(2,4-dichlorophenoxy)-
1,2-dihydro-1-hydroxy-2-iminopyrimidine A mixture of 2,4-diamino-6-(2,4-dichlorophenoxy)pyrimidine (54.2 g.) and 450 ml. of methanol was heated until a clear solution was obtained. That solution was cooled to 0° C., and m-chloroperbenzoic acid (19.0 g.) was added gradually during 10 minutes, keeping the mixture below 15° C. during the addition. The resulting mixture was then stirred for 1.25 hours, and then filtered into a solution of potassium hydroxide (10.0 g.) in 1200 ml. of water. The filter cake (A) was washed with 100 ml. of methanol. The combined filtrate, washing, and potassium hydroxide solution was cooled externally with ice for 3 hours, and was then filtered. The filter cake was air dried and recrystallized from 800 ml. of acetonitrile to give 14 g. of 6-amino-4-(2,4-dichlorophenoxy)-1,2-dihydro-1-hydroxy-2-iminopyrimidine. Concentration of the acetonitrile mother liquor and cooling gave an additional 3.4 g. of the same product.

The filter cake designated (A), above, was slurried with a solution of potassium hydroxide (10.0 g.) in 1500 ml. of water. The slurry was filtered to give 28.4 g. of unreacted 2,4-diamino-6-(2,4-dichlorophenoxy)pyrimidine.

Example 8.—6-amino-1,2-dihydro-1-hydroxy-2-imino-4-
(2,4,6-trichlorophenoxy)pyrimidine A mixture of 2,4-diamino-6-(2,4,6-trichlorophenoxy)pyrimidine (61.0 g.), ethanol (400 ml.), and ethylene glycol (300 ml.) was cooled to 0° C. To that mixture, m-chloroperbenzoic acid (69.2 g.) was added in small portions during one hour, keeping the mixture in the range 0° to 5° C. The resulting mixture was stirred for 5 hours, and then was filtered into a solution of potassium hydroxide (22.4 g.) in 4000 ml. of water. The resulting combined filtrate and solution was allowed to stand for 4 hours at about 25° C., and was then filtered to give a solid. That solid was mixed with 1800 ml. of acetonitrile, and the mixture was refluxed and filtered at the boiling point. The filter cake was again refluxed with 1800 ml. of acetonitrile, and the mixture was filtered at the boiling point. The resulting filter cake was recrystallized from 50% aqueous ethanol to give 13.5 g. of 6-amino-1,2-dihydro-1-hydroxy - 2-imino-4-(2,4,6-trichlorophenoxy)pyrimidine; M.P. 274–275° C.

U.V. (ethanol): 226 m$\mu$ ($\epsilon$=43,250); 278 m$\mu$ ($\epsilon$=5900).(0.01 N H$_2$SO$_4$): sh. 226 m$\mu$ ($\epsilon$=20,700);278 m$\mu$ ($\epsilon$=16,450).(0.1 N KOH) 226 m$\mu$ ($\epsilon$=48,200); 278 m$\mu$ ($\epsilon$=6600).

I.R. (principal bands; mineral oil mull): 3450, 3410, 3220, 3160, 1655, 1620, 1280, 1210, 1135, 1090, 1050, 860, 820, 800 cm.$^{-1}$.

Following the procedure of Example 6 but using in place of the m-chloroperbenzoic acid, in separate experiments, perbenzoic acid; perphthalic acid; peracetic acid; 2,4-dichloroperbenzoic acid; p-methylperbenzoic acid; m-nitroperbenzoic acid, and p-methoxyperbenzoic acid, the same product, 6-amino-4-(2,4-dichlorophenoxy)-1,2-dihydro-1-hydroxy-2-iminopyrimidine, is obtained.

Also following the procedure of Example 6 but using in place of the 2,4-diamino-6-(2,4-dichlorophenoxy)pyrimidine, 2,4-diamino-6-phenoxypyrimidine; 2,4-diamino-6-(p-chlorophenoxy)pyrimidine 2,4-diamino-6-(p-bromophenoxy)pyrimidine 2,4-diamino-6-(2,4-dibromophenoxy)pyrimidine and 2,4-diamino-6-(m-fluorophenoxy)pyrimidine, there are obtained 6-amino-1,2-dihydro-1-hydroxy-2-mino-4-phenoxypyrimidine; 6-amino-4-(p-chlorophenoxy)1,2 - dihydro-1-hydoxy-2-iminopyrimidine 6-amino-4 - (p-bromophenoxy) - 1,2-dihydro-1-hydroxy-2 - iminopyrimidine 6-amino-4-(2,4-dibromophenoxy) - 1,2-dihydro-1-hydroxy-2-iminopyrimidine and 6-amino-1,2-dihydro-4-(m-fluorophenoxy) - 1 - hydroxy-2 - iminopyrimidine, respectively.

Also following the procedure of Example 6 but using in place of the 2,4-diamino-6-(2,4-dichlorophenoxy) pyrimidine, 2,4-diamino-4-6 - (2,4-dichlorophenoxy) - 5-methylpyrimidine;
2,4-diamino-5-butyl-6-(2,4-dichlorophenoxy)pyrimidine;
2,4-diamino-6-(2,4-dichlorophenoxy)-5-isooctylpyrimidine;
2,4-diamino - 5-allyl-6 - (2,4-dichlorophenoxy)pyrimidine;
2,4-diamino-6-(2,4-dichlorophenoxy)-5-crotylpyrimidine;
2,4-diamino-6-(2,4-dichlorophenoxy)-5-(2-hexenyl) pyrimidine;
2,4-diamino-6-(2,4-dichlorophenoxy)-5-(2-methoxyethyl) pyrimidine;
2,4-diamino-6-(2,4-dichlorophenoxy)-5-cyclopentyl-pyrimidine;
2,4-diamino-6-(2,4-dichlorophenoxy)-5-(4-tert-butylcyclohexyl)pyrimidine;
2,4-diamino-6-(2,4-dichlorophenoxy)-5-phenylpyrimidine;
2,4-diamino-6-(2,4-dichlorophenoxy)-5-(p-tolyl)pyrimidine;
2,4-diamino-6-(2,4-dichlorophenoxy)-5-(p-tert-butylpheny)pyrimidine;
2,4-diamino-5-benzyl-6-(2,4-dichlorophenoxy)pyrimidine;
2,4-diamino-6-(2,4-dichlorophenoxy)-5-(4-phenylbutyl) pyrimidine;
2,4-diamino-6-(2,4-dichlorophenoxy)-5-(o-methylbenzyl)pyrimidine;
2,4-diamino-6-(2,4-dichlorophenoxy)-5-(4-methyl-1-naphthylmethyl)pyrimidine;

2,4-diamino-6-(2,4-dichlorophenoxy)-5-(m-methoxy-
benzyl)pyrimidine; and
2,4-diamino-6-(2,4-dichlorophenoxy)-5-(p-bromobenzyl)
pyrimidine, there are obtained 6-amino-4-(2,4-dichlorophenoxy)-1,2-dihydro-1-
hydroxy-2-imino-5-methylpyrimidine;
6-amino-5-butyl-4-(2,4-dichlorophenoxy)-1,2-dihydro-
1-hydroxy-2-iminopyrimidine;
6-amino-4-(2,4-dichlorophenoxy)-1,2-dihydro-1-hydroxy-
2-imino-5-isooctylpyrimidine;
5-allyl-6-amino-4-(2,4-dichlorophenoxy)-1,2-dihydro-
1-hydroxy-2-iminopyrimidine;
6-amino-5-crotyl-4-(2,4-dichlorophenoxy)-1,2-dihydro-1-
hydroxy-2-iminopyrimidine;
6-amino-4-(2,4-dichlorophenoxy)-1,2-dihydro-5-(2-
hexenyl)-1-hydroxy-2-iminopyrimidine;
6-amino-4-(2,4-dichlorophenoxy)-1,2-dihydro-1-hydroxy-
2-imino-5-(2-methoxyethyl)pyrimidine;
6-amino-5-cyclopentyl-4-(2,4-dichlorophenoxy)-1,2-dihy-
dro-1-hydroxy-2-iminopyrimidine;
6-amino-5-(4-tert-butylcyclohexyl)-4-(2,4-dichloro-
phenoxy)-1,2-dihydro-1-hydroxy-2-iminopyrimidine;
6-amino-4-(2,4-dichlorophenoxy)-1,2-dihydro-1-hydroxy-
2-imino-5-phenylpyrimidine;
6-amino-4-(2,4-dichlorophenoxy)-1,2-dihydro-1-hydroxy-
2-imino-5-(p-tolyl)pyrimidine;
6-amino-5-(p-tert-butylpheny)-4-(2,4-dichlorophenoxy)-
1,2-dihydro-1-hydroxy-2-iminopyrimidine;
6-amino-5-benzyl-4-(2,4-dichlorophenoxy)-1,2-dihydro-
1-hydroxy-2-iminopyrimidine;
6-amino-4-(2,4-dichlorophenoxy)-1,2-dihydro-1-hydroxy-
2-imino-5-(4-phenylbutyl)pyrimidine;
6-amino-4-(2,4-dichlorophenoxyl)-1,2-dihydro-1-hydroxy-
2-imino-5-(o-methylbenzyl)pyrimidine;
6-amino-4-(2,4-dichlorophenoxy)-1,2-dihydro-1-hydroxy-
2-imino-5-(4-methyl-1-naphthylmethyl)pyrimidine;
6-amino-4-(2,4-dichlorophenoxy)-1,2-dihydro-1-hydroxy-
2-imino-5-(m-methoxybenzyl)pyrimidine; and
6-amino-5-(p-bromobenzyl)-4,(2,4-dichlorophenoxy)-
1,2-dihydro-1-hydroxy-2-iminopyrimidine, respectively.

Following the procedure of Example 4, each of the above-mentioned specific 1,2-dihydro-1-hydroxypyrimidines is transformed to the corresponding hydrochloric acid, benzoic acid, lactic acid, phosphoric acid, sulfuric acid, and succinic acid addition salts.

Also following the procedure of Example 6 but using in place of the 2,4-diamino-6-(2,4-dichlorophenoxy)pyrimidine, each of the other 2,4-diamino-5-substituted-6-phenoxypyrimidines and each of the other 2,4-diamino-5-substituted-6-halophenoxypyrimidines indicated above as preparable by the procedure of Example 1, there are obtained the corresponding 6-amino-1,2-dihydro-1-hydroxy-2-imino-4-phenoxy-5-substituted-pyrimidines and 6-amino-1,2-dihydro-4-halophenoxy-1-hydroxy-2-imino-5-substituted-pyrimidines.

Example 9.—6-amino-1,2-dihydro-1-hydroxy-2-imino-
4-piperidinopyrimidine

A mixture of 6-amino-4-(2,4-dichlorophenoxy)-1,2-dihydro-1-hydroxy-2-iminopyrimidine (3.5 g.) and piperidine (20 ml.) was heated in a sealed, heavy-wall, glass tube in an oil bath at 150° C. for 2.5 hours. The tube and contents were then cooled slowly to 25° C. The tube was opened and the reaction mixture filtered. The solid was washed first with piperidine and then with diethyl ether, and was dried to give 1.2 g. of 6-amino-1,2-dihydro-1-hydroxy-2-imino-4-piperidinopyrimidine; M.P. 262–264° C. with decomposition.

Analysis.—Calcd. for $C_9H_{15}N_5O$: C, 51.66; H, 7.22; N, 33.47; O, 7.65. Found: C, 52.27; H, 7.00; N, 33.34; O, 7.56.

U.V. (ethanol): 230 m$\mu$ ($\epsilon$=35,210); 261 m$\mu$ ($\epsilon$=11,210); 285 m$\mu$ ($\epsilon$=11,790). (0.01 N $H_2SO_4$): 232 m$\mu$ ($\epsilon$=26,350); 280 m$\mu$ ($\epsilon$=23,850). (0.01 N KOH): 231 m$\mu$ ($\epsilon$=36,100); 261.5 m$\mu$ ($\epsilon$=11,400); 285 m$\mu$ ($\epsilon$=12,040).

I.R. (principal bands; mineral oil mull); 3450, 3220, 3400, 3370, 3260, 1655, 1250, 1230, 1210, 1165, 1020 cm.$^{-1}$.

Addition of absolute ethanol containing one equivalent of hydrogen chloride to an absolute ethanol solution of 6-amino-1,2-dihydro-1-hydroxy-2-imino-4-piperidinopyrimidine, followed by addition of about 4 volumes of diethyl ether, gives the corresponding monohydrochloride. Similar use of 2 equivalents of hydrogen chloride gives the corresponding dihydrochloride. Similar separate use of benzoic acid, lactic acid, succinic acid, maleic acid, sulfuric acid, and phosphoric acid gives the corresponding 1,2-dihydro-1-hydroxyprimidine acid addition salts.

Example 10.—6-amino-1,2-dihydro-1-hydroxy-2-imino-
4-piperidinopyrimidine

A mixture of 6-amino-4-(2,4-dichlorophenoxy)-1,2-dihydro-1-hydroxy-2-iminopyrimidine (22.0 g.) and piperidine (200 ml.) was heated in a sealed, heavy-wall, glass tube in an oil bath up to the range 175–180° C. during 1 hour, and was held within that range for 4 hours. The tube and contents were then cooled slowly to 25° C. during about 9 hours. The tube was opened and the reaction mixture was filtered. The solid was washed first with about 15 ml. of piperidine and then with diethyl ether to give 12.1 g. of 6-amino-1,2-dihydro-1-hydroxy-2-imino-4-piperidinopyrimidine; M.P. 262–266° with decomposition starting at 262° C.

Following the procedure of Example 10 but using in place of the piperidine, dimethylamine; diethylamine; dibutylamine; N-methylbutylamine; N-ethylhexylamine; butylamine; octylamine; diallylamine; dicrotylamine; di-(2-hexenyl)amine; N-methylallylamine; allylamine; 2-octenylamine; dibenzylamine; diphenethylamine; N-methylbenzylamine; N-ethyl-(1-naphthylmethyl)amine; benzylamine; 3-phenylpropylamine; cyclohexylamine; dicyclohexylamine; cyclobutylamine; N-methyl-(4-tert-butylcyclohexyl)amine; azetidine; pyrrolidine; 2-methylpyrrolidine; 3-ethylpyrrolidine; 2,5-dimethylpyrrolidine; 2-methyl-5-ethyl-piperidine; 3-isopropylpiperidine; 2,4,6-trimethylpiperidine; hexahydroazepine; 4-tert-butylhexahydroazepine; heptamethylenimine; octamethylenimine; morpholine; 2-ethylmorpholine; and 6-amino-1,2-dihydro-4-dimethylamino-1-hydroxy-
2-iminopyrimidine;
6-amino-4-diethylamino-1,2-dihydro-1-hydroxy-
2-iminopyrimidine;
6-amino-4-dibutylamino-1,2-dihydro-1-hydroxy-
2-iminopyrimidine;
6-amino-1,2-dihydro-1-hydroxy-2-imino-4-(N-methyl-
butylamino)pyrimidine;
6-amino-1,2-dihydro-4-(N-ethylhexylamino)-1-hydroxy-
2-iminopyrimidine;
6-amino-4-butylamino-1,2-dihydro-1-hydroxy-
2-iminopyrimidine;
6-amino-1,2-dihydro-1-hydroxy-2-imino-
4-octylaminopyrimidine;
6-amino-4-diallylamino-1,2-dihydro-1-hydroxy-
2-iminopyrimidine;
6-amino-4-dicrotylamino-1,2-dihydro-1-hydroxy-
2-iminopyrimidine;
6-amino-4-[di-(2-hexenyl)amino]-1,2-dihydro-
1-hydroxy-2-iminopyrimidine;
6-amino-1,2-dihydro-1-hydroxy-2-imino-4-(N-methyl-
allylamino)pyrimidine;
4-allylamino-6-amino-1,2-dihydro-1-hydroxy-
2-iminopyrimidine;
6-amino-1,2-dihydro-1-hydroxy-2-imino-4-(2-octenyl-
amino)pyrimidine;
6-amino-4-dibenzylamino-1,2-dihydro-1-hydroxy-
2-iminopyrimidine;

6-amino-1,2-dihydro-4-diphenethylamino-1-hydroxy-2-iminopyrimidine;
6-amino-1,2-dihydro-1-hydroxy-2-imino-4-(N-methylbenzylamino)pyrimidine;
6-amino-1,2-dihydro-4-[N-ethyl-(1-naphthylmethyl)amino]-1-hydroxy-2-iminopyrimidine;
6-amino-4-benzylamino-1,2-dihydro-1-hydroxy-2-iminopyrimidine;
6-amino-1,2-dihydro-1-hydroxy-2-imino-4-(3-phenylpropylamino)pyrimidine;
6-amino-4-cyclohexylamino-1,2-dihydro-1-hydroxy-2-iminopyrimidine;
6-amino-4-dicyclohexylamino-1,2-dihydro-1-hydroxy-2-iminopyrimidine;
6-amino-4-cyclobutylamino-1,2-dihydro-1-hydroxy-2-iminopyrimidine;
6-amino-1,2-dihydro-1-hydroxy-2-imino-4-[N-methyl-(4-tert-butylcyclohexyl)amino]pyrimidine;
6-amino-4-(1-azetidinyl)-1,2-dihydro-1-hydroxy-2-iminopyrimidine;
6-amino-1,2-dihydro-1-hydroxy-2-imino-4-(1-pyrrolidinyl)pyrimidine;
6-amino-1,2-dihydro-1-hydroxy-2-imino-4-[1-(2-methylpyrrolidinyl)]pyrimidine;
6-amino-1,2-dihydro-4-[1-(3-ethylpyrrolidinyl)]-1-hydroxy-2-iminopyrimidine;
6-amino-1,2-dihydro-4-[1-(2,5-dimethylpyrrolidinyl)]-1-hydroxy-2-iminopyrimidine;
6-amino-1,2-dihydro-1-hydroxy-2-imino-4-(2-methyl-5-ethylpiperidino)pyrimidine;
6-amino-1,2-dihydro-1-hydroxy-2-imino-4-(3-isopropylpiperidino)pyrimidine;
6-amino-1,2-dihydro-1-hydroxy-2-imino-4-(2,4,6-trimethylpiperidino)pyrimidine;
6-amino-1,2-dihydro-4-(1-hexahydroazepinyl)-1-hydroxy-2-iminopyrimidine;
6-amino-4-[1-(4-tert-butylhexahydroazepinyl)]-1,2-dihydro-1-hydroxy-2-iminopyrimidine;
6-amino-1,2-dihydro-4-(1-heptamethylenimino)-1-hydroxy-2-iminopyrimidine;
6-amino-1,2-dihydro-1-hydroxy-2-imino-4-(1-octamethylenimino)pyrimidine;
6-amino-1,2-dihydro-1-hydroxy-2-imino-4-morpholinopyrimidine;
6-amino-1,2-dihydro-4-(2-ethylmorpholino)-1-hydroxy-2-iminopyrimidine; and
6-amino-1,2-dihydro-1-hydroxy-2-imino-4-(4-methyl-1-piperazinyl)pyrimidine, respectively.

Following the procedure of Example 9, each of the above-mentioned specific 1,2-dihydro-1-hydroxypyrimidines is transformed to the corresponding hydrochloric acid, benzoic acid, lactic acid, maleic acid, phosphoric acid, sulfuric acid, and succinic acid addition salts.

Also following the procedure of Example 10 but using in place of the piperidine, each of the primary and secondary amines corresponding to each of the specific examples of

and heterocyclic moieties within the scope of $R_1$ as defined and given above, there are obtained the corresponding 6-amino - 1,2 - dihydro-1-hydroxy-2-iminopyrimidines, substituted at the 4-position with a mono-substituted or disubstituted, including heterocyclic, amino moiety.

Also following the procedure of Example 10 but using in place of the 6-amino-4-(2,4-dichlorophenoxy)-1,2-dihydro-1-hydroxy-2-iminopyrimidine, 6-amino-4-(2,4-dichlorophenoxy)-1,2-dihydro-1-hydroxy-2-imino-5-methylpyrimidine;
6-amino-5-butyl-4-(2,4-dichlorophenoxy)-1,2-dihydro-1-hydroxy-2-iminopyrimidine;
6-amino-4-(2,4-dichlorophenoxy)-1,2-dihydro-1-hydroxy-2-imino-5-isooctylpyrimidine;
5-allyl-6-amino-4-(2,4-dichlorophenoxy)-1,2-dihydro-2-iminopyrimidine;
6-amino-5-crotyl-4-(2,4-dichlorophenoxy)-1,2-dihydro-1-hydroxy-2-iminopyrimidine;
6-amino-4-(2,4-dichlorophenoxy)-1,2-dihydro-5-(2-hexenyl)-1-hydroxy-2-iminopyrimidine;
6-amino-4-(2,4-dichlorophenoxy)-1,2-dihydro-1-hydroxy-2-imino-5-(2-methoxyethyl)pyrimidine;
6-amino-5-cyclopentyl-4-(2,4-dichlorophenoxy)-1,2-dihydro-1-hydroxy-2-iminopyrimidine;
6-amino-5-(4-tert-butylcyclohexyl)-4-(2,4-dichlorophenoxy)-1,2-dihydro-1-hydroxy-2-iminopyrimidine;
6-amino-4-(2,4-dichlorophenoxy)-1,2-dihydro-1-hydroxy-2-imino-5-phenylpyrimidine;
6-amino-4-(2,4-dichlorophenoxy)-1,2-dihydro-1-hydroxy-2-imino-5-(p-tolyl)pyrimidine;
6-amino-5-(p-tert-butylphenyl)-4-(2,4-dichlorophenoxy)-1,2-dihydro-1-hydroxy-2-iminopyrimidine;
6-amino-5-benzyl-4-(2,4-dichlorophenoxy)-1,2-dihydro-1-hydroxy-2-iminopyrimidine;
6-amino-4-(2,4-dichlorophenoxy)-1,2-dihydro-1-hydroxy-2-imino-5-(4-phenylbutyl)pyrimidine;
6-amino-4-(2,4-dichlorophenoxy)-1,2-dihydro-1-hydroxy-2-imino-5-(o-methylbenzyl)pyrimidine;
6-amino-4-(2,4-dichlorophenoxy)-1,2-dihydro-1-hydroxy-2-imino-5-(4-methyl-1-naphthylmethyl)pyrimidine;
6-amino-4-(2,4-dichlorophenoxy)-1,2-dihydro-1-hydroxy-2-imino-5-(m-methoxybenzyl)pyrimidine; and
6-amino-5-(p-bromobenzyl)-4-(2,4-dichlorophenoxy)-1,2-dihydro-1-hydroxy-2-iminopyrimidine, there are obtained
6-amino-1,2-dihydro-1-hydroxy-2-imino-5-methyl-4-piperidinopyrimidine;
6-amino-5-butyl-1,2-dihydro-1-hydroxy-2-imino-4-piperidinopyrimidine;
6-amino-1,2-dihydro-1-hydroxy-2-imino-5-isooctyl-4-piperidinopyrimidine;
5-allyl-6-amino-1,2-dihydro-1-hydroxy-2-imino-4-piperidinopyrimidine;
6-amino-5-crotyl-1,2-dihydro-1-hydroxy-2-imino-4-piperidinopyrimidine;
6-amino-1,2-dihydro-5-(2-hexenyl)-1-hydroxy-2-imino-4-piperidinopyrimidine;
6-amino-1,2-dihydro-1-hydroxy-2-imino-5-(2-methoxyethyl)-4-piperidinopyrimidine;
6-amino-5-cyclopentyl-1,2-dihydro-1-hydroxy-2-imino-4-piperidinopyrimidine;
6-amino-5-(4-tert-butylcyclohexyl)-1,2-dihydro-1-hydroxy-2-imino-4-piperidinopyrimidine;
6-amino-1,2-dihydro-1-hydroxy-2-imino-5-phenyl-4-piperidinopyrimidine;
6-amino-1,2-dihydro-1-hydroxy-2-imino-4-piperidino-5-(p-tolyl)pyrimidine;
6-amino-5-(p-tert-butylphenyl)-1,2-dihydro-1-hydroxy-2-imino-4-piperidinopyrimidine;
6-amino-5-benzyl-1,2-dihydro-1-hydroxy-2-imino-4-piperidinopyrimidine;
6-amino-1,2-dihydro-1-hydroxy-2-imino-5-(4-phenylbutyl)-4-piperidinopyrimidine;
6-amino-1,2-dihydro-1-hydroxy-2-imino-5-(o-methylbenzyl)-4-piperidinopyrimidine;
6-amino-1,2-dihydro-1-hydroxy-2-imino-5-(4-methyl-1-naphthylmethyl)-4-piperidinopyrimidine;
6-amino-1,2-dihydro-1-hydroxy-2-imino-5-(m-methoxybenzyl)-4-piperidinopyrimidine; and
6-amino-1,2-dihydro-1-hydroxy-2-imino-5-(p-bromobenzyl)-4-piperidinopyrimidine, respectively.

Following the procedure of Example 9, each of the above-mentioned specific 1,2-dihydro-1-hydroxypyrimidines is transformed to the corresponding hydrochloric acid, benzoic acid, lactic acid, maleic acid, phosphoric acid, sulfuric acid, and succinic acid addition salts.

Also following the procedure of Example 10 but using in place of the combination of the 6-amino-4-(2,4-dichlorophenoxy) - 1,2 - dihydro-1-hydroxy-2-iminopyrimidine and the piperidine, each of the above-mentioned 6-amino - 1,2-dihydro-1-hydroxy-2-imino-4-phenoxypyrimidines or 6-amino-1,2-dihydro-1-hydroxy-2-imino-4-halophenoxypyrimidines, unsubstituted or substituted at the 5-position as above-described, and each of the above-mentioned primary and secondary amines, there are obtained the corresponding 6-amino-1,2-dihydro-1-hydroxy-2-imino pyrimidines wherein the 4-phenoxy or 4-halophenoxy substituent has been replaced with a monosubstituted or disubstituted, including heterocyclic, amino moiety.

Example 11.—6-amino-1,2-dihydro-1-hydroxy-2-imino-5-nitroso-4-piperidinopyrimidine 6 - amino - 1,2 - dihydro-1-hydroxy-2-imino-4-piperidinopyrimidine (4.5 g.) was mixed with 25 ml. of 95% sulfuric acid, keeping the temperature of the mixture below 40° C. The resulting solution was cooled to 15° C., and a solution of sodium nitrite (1.4 g.) in 2 ml. of water was added dropwise with stirring, keeping the mixture below 20° C. The resulting mixture was stirred for 45 minutes at 15° C., and was then poured into a mixture of sodium hydroxide (37 g.), crushed ice (100 g.), and water (200 ml.). That mixture was stirred and neutralized with solid sodium carbonate. The solid which formed was filtered, washed with water, and recrystallized from 75 ml. of ethanol to give 2.1 g. of 6 - amino-1,2-dihydro-1-hydroxy-2-imino-5-nitroso-4-piperidinopyrimidine; M.P. 190–191.5° C.

Analysis.—Calcd. for $C_9H_{14}N_6O_2$: C, 45.37; H, 5.92. Found: C, 45.51; H, 5.73.

U.V. (ethanol): 219 m$\mu$ ($\epsilon$=17,300); sh. 240 m$\mu$ ($\epsilon$=12,800); 264 m$\mu$ ($\epsilon$=16,150; 325 m$\mu$ ($\epsilon$=12,350). (0.01 N $H_2SO_4$): 242 m$\mu$ ($\epsilon$=22,700); 322 m$\mu$ ($\epsilon$=12,550). (0.01 N KOH) 238 m$\mu$ ($\epsilon$=16,350); sh. 270 m$\mu$ ($\epsilon$=6900); 347 m$\mu$ ($\epsilon$=12,050).

I.R. (principal bands; mineral oil mull): 3390, 3200, 3190, 1655, 1615, 1560, 1525, 1485, 1340, 1180, 1140, 1125, 1020, 855, 755, 725 cm.$^{-1}$.

Addition of absolute ethanol containing one equivalent of hydrogen chloride to an absolute ethanol solution of 6 - amino - 1,2 - dihydro - 1 - hydroxy-2-imino-5-nitroso-4-piperidinopyrimidine, followed by addition of about 4 volumes of diethyl ether, gives the corresponding hydrochloride.

Following the procedure of Example 11 but using in place of the 6-amino-1,2-dihydro-1-hydroxy-2-imino-4-piperidinopyrimidine, each of the specific 6-amino-1,2-dihydro-1-hydroxy-2-iminopyrimidines substituted at the 4-position with a monosubstituted or disubstituted including heterocyclic amino moiety, and unsubstituted at the 5-position, there are obtained the corresponding 6-amino - 1,2 - dihydro - 1 - hydroxy - 2 - imino-5-nitrosopyrimidine, substituted at the 4-position as in the reactant.

Example 12.—6-amino-4-(2,4-dichlorophenoxy)-1,2-dihydro-1-hydroxy-2-imino-5-nitrosopyrimidine Following the procedure of Example 11, 6-amino-4-(2,4 - dichlorophenoxy)1,2 - dihydro-1-hydroxy-2-iminopyrimidine was mixed with sulfuric acid and then with sodium nitrite to give 6-amino-4-(2,4-dichlorophenoxy)-1,2-dihydro-1-hydroxy-2-imino-5-nitrosopyrimidine.

Addition of absolute ethanol containing one equivalent of hydrogen chloride to an absolute ethanol solution of 6 - amino - 4 - (2,4 - dichlorophenoxy)1,2-dihydro-1-hydroxy-2-imino-5-nitrosopyrimidine, followed by addition of about 4 volumes of diethyl ether, gives the corresponding hydrochloride.

Following the procedure of Example 12 but using in place of the 6 - amino - 4-(2,4-dichlorophenoxy)-1,2-dihydro - 1 - hydroxy - 2 - iminopyrimidine, 6-amino-1,2-dihydro - 1 - hydroxy-2-imino-4-phenoxypyrimidine and each of the above-mentioned specific 6-amino-1,2-dihydro-1 - hydroxy - 2 - imino - 4 - halophenoxypyrimidines, unsubstituted at the 5-position, there are obtained the corresponding 5-nitrosopyrimidines.

Example 13.—6-amino-1,2-dihydro-1-hydroxy-2-imino-5-nitroso-4-piperidinopyrimidine Following the procedure of Example 10, 6-amino-4-(2,4 - dichlorophenoxy) - 1,2 - dihydro - 1 - hydroxy - 2-imino-5-nitrosopyrimidine was mixed with piperidine and heated in a sealed glass tube to give 6-amino-1,2-dihydro-1-hydroxy - 2 - imino - 5 - nitroso - 4-piperidinopyrimidine with essentially the same physical properties described in Example 11.

Following the procedure of Example 13 but using in place of piperidine, each of the above-mentioned primary and secondary including heterocyclic amines, there are obtained the corresponding 6 - amino-1,2-dihydro-1-hydroxy-2-imino-5-nitrosopyrimidines substituted at the 4-position with a mono-substituted or disubstituted amino moiety, and with essentially the same physical properties as the compounds prepared by the alternative route as exemplified in Example 11.

Example 14.—6-amino-1,2-dihydro-1-hydroxy-2-imino-5-nitro-4-piperidinopyrimidine A solution of 6-amino-1,2-dihydro-1-hydroxy-2-imino-4-piperidinopyrimidine (3.0 g.) in 10 ml. of 95% sulfuric acid was cooled to 10° C. A mixture of 70% nitric acid (1 ml.) and 95% sulfuric acid (4 ml.) was added dropwise with stirring during 1.5 hours. The resulting solution was stirred an additional 30 minutes, and was then poured onto 250 g. of crushed ice. The mixture was mixed first with potassium hydroxide (25.5 g. of 85%) and then with potassium bicarbonate (12.0 g.), keeping the temperature of the mixture below 20° C. The mixture was then filtered, and the filter cake was washed with water and slurried with 300 ml. of water. The slurry was filtered and the solid was recrystallized from a mixture of water (175 ml.) and ethanol (75 ml.) to give 2.4 g. of 6-amino - 1,2 - dihydro - 1 - hydroxy - 2 - imino - 5 - nitro-4-piperidinopyrimidine; M.P. 248–250° C.

Analysis.— Calcd. for $C_9H_{14}N_6O_3$: C, 42.51; H, 5.55; O, 18.88. Found: C, 42.37; H, 5.44; O, 18.75.

U.V. (ethanol): 222 m$\mu$ ($\epsilon$=21,000); 270 m$\mu$ ($\epsilon$=20,900); sl. sh. 340 m$\mu$ ($\epsilon$=5300); 378 m$\mu$ ($\epsilon$=5800). (0.01 N $H_2SO_4$): sh. 236 m$\mu$ ($\epsilon$=1740); 260 m$\mu$ ($\epsilon$=26,050); 293 m$\mu$ ($\epsilon$=6750); 343 m$\mu$ ($\epsilon$=7250). (0.01 N KOH): 220 m$\mu$ ($\epsilon$=20,700); sh. 248 m$\mu$ ($\epsilon$=15,450); 268 m$\mu$ ($\epsilon$=14,550); 378 m$\mu$ ($\epsilon$=9350).

I.R. (principal bands; mineral oil mull): 3140, 3390, 3150, 1655, 1640, 1610, 1565, 1525, 1480, 1265, 1175, 1120, 1020 cm.$^{-1}$.

Addition of absolute ethanol containing one equivalent of hydrogen chloride to an absolute ethanol solution of 6-amino-1,2-dihydro-1-hydroxy-2-imino-5-nitro-4-piperidinopyrimidine, followed by addition of about 4 volumes of diethyl ether, gives the corresponding hydrochloride.

Following the procedure of Example 14 but using in place of the 6-amino-1,2-dihydro-1-hydroxy-2-imino-4-piperidinopyrimidine, each of the specific 6-amino-1,2-dihydro-1-hydroxy-2-iminopyrimidines substituted at the 4-position with a monosubstituted or disubstituted including heterocyclic amino moiety, and unsubstituted at the 5-position, there are obtained the corresponding 6-amino-1,2-dihydro-1-hydroxy-2-imino-5-nitropyrimidines, substituted at the 4-position as in the reactant.

Example 15.—6-amino-4-(2,4-dichloro-6-nitrophenoxy)-1,2-dihydro-1-hydroxy-2-imino-5-nitropyrimidine A solution of 6-amino-4-(2,4-dichlorophenoxy)-1,2-dihydro-1-hydroxy-2-iminopyrimidine (3.0 g.) in 10 ml. of 95% sulfuric acid was cooled to 10° C. A mixture of 70% nitric acid (1 ml.) and 95% sulfuric acid (5 ml.) was added dropwise with stirring during 1.5 hours. The resulting mixture was stirred an additional hour at 20° C., and was then poured onto crushed ice. The mixture was stirred and the inner glass walls of the container were rubbed with a glass rod until the ice melted. The resulting solid was filtered, washed with water, and extracted with ethanol to give 2.2 g. of 6-amino-4-(2,4-dichloro-6-nitrophenoxy) - 1,2 - dihydro-1-hydroxy-2-imino-5-nitropyrimidine; M.P. 229–230° C.

*Analysis.*—Calcd. for $C_{10}H_6N_6O_6Cl_2$: C, 31.85; H, 1.60; Cl, 18.80. Found: C, 32.39; H, 1.81; Cl, 18.35.

U.V. (ethanol): 218 m$\mu$ ($\epsilon$=36,950); 267 m$\mu$ ($\epsilon$=14,650); 313 m$\mu$ ($\epsilon$=12,600). (0.01 N $H_2SO_4$): 217 m$\mu$ ($\epsilon$=36,850); 266 m$\mu$ ($\epsilon$=14,540); 311 m$\mu$ ($\epsilon$=13,520). (0.01 N KOH): 220 m$\mu$ ($\epsilon$=36,550); 269 m$\mu$ ($\epsilon$=9,425); 369 m$\mu$ ($\epsilon$=13,680).

I.R. (principal bands; mineral oil mull): 3440, 3360, 3320, 3260, 1655, 1640, 1625, 1525, 1510, 1490, 1560, 1365, 1345, 1235, 1215, 1140, 1090, 815, 790, 760, 730 cm.$^{-1}$.

Example 16.—6-amino-1,2-dihydro-1-hydroxy-2-imino-5-nitro-4-piperidinopyrimidine Following the procedure of Example 10, 6-amino-4-(2,4 - dichloro-6-nitrophenoxy)-1,2-dihydro-1-hydroxy-2-imino-5-nitropyrimidine was mixed with piperidine and heated in a sealed glass tube to give 6-amino-1,2-dihydro-1-hydroxy-2-imino-5-nitro-4-piperidinopyrimidine with essentially the same physical properties recited in Example 14.

Example 17.—5,6-diamino-1,2-dihydro-1-hydroxy-2-imino-4-piperidinopyrimidine

A mixtures of 6-amino-1,2-dihydro-1-hydroxy-2-imino-5-nitro-4-piperidinopyrimidine (5.5 g.), methanol (50 ml.), concentrated hydrochloric acid (2.0 ml.), and 10% palladium on charcoal (1.0 g.) was shaken with hydrogen at 50 p.s.i. initial pressure at about 25° C. The theoretical amount of hydrogen was absorbed in about 30 minutes. The mixture was then filtered, and solvent was removed under reduced pressure to give 5.3 g. of 5,6-diamino-1,2-dihydro-1-hydroxy-2-imino - 4 - piperidinopyrimidine hydrochloride in the form of a hygroscopic amorphous solid.

U.V. (ethanol): sh. 223 m$\mu$ ($\epsilon$=14,670); 240 m$\mu$ ($\epsilon$=17,790; 315 m$\mu$ ($\epsilon$=8640). (0.01 N KOH): sh. 223 m$\mu$ ($\epsilon$=15,750); 238 m$\mu$ ($\epsilon$=18,540); sh. 263 m$\mu$ ($\epsilon$=7130); 317 m$\mu$ ($\epsilon$=7540).

I.R. (principal bands; mineral oil mull): 3300, 3160, 2600, 1650, 1620, 1545, 1525, 1235, 1205, 1160, 1125, 1020 cm.$^{-1}$.

Addition of an equivalent amount of aqueous sodium hydroxide solution to an aqueous solution of 5,6-diamino-1,2-dihydro-1-hydroxy-2-imino-4-piperidinopyrimidine hydrochloride gives the corresponding free base. That free base is isolated by passing a methanol solution of the hydrochloride over a basic ion exchange resin such as Amberlite IR-400 followed by evaporation of the ether solution under reduced pressure and in the absence of moisture and oxygen.

Following the procedure of Example 17 but using in place of the 6-amino-1,2-dihydro-1-hydroxy-2-imino-5-nitro-4-piperidinopyrimidine, each of the above-mentioned 6 - amino-1,2-dihydro-1-hydroxy-2-imino - 5 - nitropyrimidines substituted at the 4-position with a mono-substituted or disubstituted including heterocyclic amino moiety is catalytically hydrogenated to give the corresponding 5,6-diamino-1,2-dihydro-1-hydroxy-2-iminopyrimidine hydrochloride, substituted at the 4-position as in the reactant. Each of those 5,6-diamino compounds is then transformed to the free base as described in Example 16.

Example 18.—5,6-diamino-1,2-dihydro-1-hydroxy-2-imino-4-piperidinopyrimidine

Following the procedure of Example 17, 6-amino-1,2-dihydro-1-hydroxy-2-imino-5-nitroso-4 - piperidinopyrimidine is shaken with hydrogen in the presence of palladium on charcoal to give the hydrochloride of 5,6-diamino-1,2-dihydro-1-hydroxy - 2 - imino-4-piperidinopyrimidine with essentially the same physical properties recited in Example 17.

Following the procedure of Example 18 but using in place of the 6-amino-1,2-dihydro-1-hydroxy-2-imino-5-nitroso-4-piperidinopyrimidine, each of the above-mentioned 6-amino-1,2-dihydro-1-hydroxy-2-imino-5-nitroso-pyrimidines substituted at the 4-position with a mono-substituted or disubstituted including heterocyclic amino moiety is catalytically hydrogenated to give the corresponding 5,6-diamino-1,2-dihydro-2-iminopyrimidine hydrochloride substituted at the 4-position as in the reactant. Each of those 5,6-diamino compounds is then transformed to the free base as described in Example 17. Each hydrochloride and free base has essentially the same physical properties as the 5,6-diamino compound prepared from the corresponding 5-nitro compound as described above.

Example 19.—5,6-diamino-4-(2,4-dichlorophenoxy)-1,2-dihydro-1-hydroxy-2-iminopyrimidine Following the procedure of Example 17, 6-amino-4-(2,4 - dichlorophenoxy) - 1,2 - dihydro - 1 - hydroxy - 2-imino - 5 - nitrosopyrimidine is shaken with hydrogen in the presence of palladium on charcoal to give the hydrochloride of 5,6 - diamino - 4 - (2,4 - dichlorophenoxy)-1,2 - dihydro - 1 - hydroxy - 2 - iminopyrimidine. The corresponding free base is obtained by neutralization of said hydrochloride, also as described in Example 17.

Following the procedure of Example 19 but using in place of the 6 - amino - 4 - (2,4 - dichlorophenoxy) - 1,2-dihydro - 1 - hydroxy - 2 - imino - 5 - nitrosopyrimidine, 6 - amino - 1,2 - dihydro - 1 - hydroxy - 2 - imino - 5-nitroso - 4 - phenoxypyrimidine and each of the above-mentioned 6 - amino - 1,2 - dihydro - 1 - hydroxy - 2-imino - 4 - halophenoxy - 5 - nitrosopyrimidines, there are obtained the corresponding 5,6-diamino compounds first as hydrochlorides and then as free bases.

Example 20.—5,6-diamino-4-(2-amino-4,6-dichlorophenoxy)-1,2-dihydro-1-hydroxy-2-iminopyrimidine Following the procedure of Example 17, 6-amino-4-(2,4 - dichloro - 6 - nitrophenoxy) - 1,2 - dihydro - 1 - hydroxy-2-imino-5-nitropyrimidine is shaken with hydrogen in the presence of palladium on charcoal to give the hydrochloride of 5,6 - diamino - 4 - (2 - amino - 4,6-dichlorophenoxy) - 1,2 - dihydro - 1 - hydroxy - 2 - iminopyrimidine. The corresponding free base is obtained by neutralization of said hydrochloride, also as described in Example 17.

Following the procedure of Example 20 but using in place of the 6 - amino - 4 - (2,4 - dichloro - 6 - nitrophenoxy) - 1,2 - dihydro - 1 - hydroxy - 2 - imino - 5-nitropyrimidine, 6 - amino - 1,2 - dihydro - 1 - hydroxy-2 - imino - 5 - nitro - 4 - phenoxypyrimidine and each of the above-mentioned 6 - amino - 1,2 - dihydro - 1-hydroxy - 2 - imino - 4 - halophenoxy - 5 - nitropyrimidines, there are obtained the corresponding 5,6-diamino compounds, first as hydrochlorides and then as free bases. Those diamino compounds have essentially the same physical properties as the diamino compounds prepared from the corresponding nitroso compounds as described above.

Example 21.—5,6-diamino-1,2-dihydro-1-hydroxy-2-imino-4-piperidinopyrimidine

Following the procedure of Example 10, 5,6-diamino-4 - (2,4 - dichlorophenoxy) - 1,2 - dihydro - 1 - hydroxy-2 - iminopyrimidine was mixed with piperidine and heated in a sealed glass tube to give 5,6-diamino-1,2-dihydro-1-hydroxy-2-imino-4- piperidinopyrimidine hydrochloride with essentially the same physical properties recited in Example 17. The free base corresponding to this hydrochloride was obtained as described in Example 17.

Following the procedure of Example 21 but using in place of the piperidine, each of the primary and secondary including heterocyclic amines mentioned above, there are obtained first the hydrochlorides and then the free bases of the corresponding 5,6 - diamino - 1,2 - dihydro - 1 - hydroxy - 2 - iminopyrimidines substituted at the 4-position with a mono-substituted or disubstituted amino moiety and with essentially the same physical properties as the compounds prepared by the alternative route as exemplified in Examples 17 and 18.

Example 22.—5-bromo-2,4-diamino-6-(2,4-dichlorophenoxy)pyrimidine

A mixture of 2,4-diamino-6-(2,4-dichlorophenoxy)pyrimidine (81.3 g.), N-bromosuccinimide (53.4 g.), and carbon tetrachloride (600 ml.) was boiled under reflux for one hour. The resulting reaction mixture was evaporated to dryness, and the residue was washed with water and filtered. Recrystallization from methanol gave 5-bromo - 2,4 - diamino - 6 - 2,4 - dichlorophenoxy)pyrimidine.

Following the procedure of Example 22 but substituting for the N-bromosuccinimide, N-chlorosuccinimide and N-iodosuccinimide, there are obtained the corresponding 5-chloro and 5-iodo-2,4-diamino-6-(2,4-dichlorophenoxy)pyrimidines.

Also following the procedure of Example 22 but substituting for the 2,4-diamino-6-(2,4-dichlorophenoxy)pyrimidine, 2,4-diamino-6-phenoxypyrimidine and each of the above-mentioned 2,4-diamino-6-halophenoxypyrimidines, there are obtained 5-bromo-2,4-diamino-6-phenoxypyrimidine and the corresponding 5-bromo-2,4-diamino-6-halophenoxypyrimidines, respectively.

Example 23.—6-amino-5-bromo-4-(2,4-dichlorophenoxy)-1,2-dihydro-1-hydroxy-2-iminopyrimidine A solution of 5-bromo-2,4-diamino-6-(2,4-dichlorophenoxy)pyrimidine (21.0 g.), acetone (400 ml.), and ethanol (100 ml.) was cooled to 0° C. During 25 minutes, m-chloroperbenzoic acid (24.0 g.) was added with stirring, the mixture being maintained at about 0° C. The mixture was stirred for an additional 4 hours, and was then filtered into a solution of potassium hydroxide (9.2 g. of 85%) in 1500 ml. of water. The combined filtrate and solution were stirred, and the resulting solid was filtered and recrystallized from 600 ml. of acetonitrile to give 6-amino-5 - bromo - 4 - (2,4 - dichlorophenoxy) - 1,2 - dihydro-1-hydroxy-2-iminopyrimidine.

Following the procedure of Example 23, each of the above-mentioned 5-halo-2,4-diamino-6-phenoxypyrimidines and 5-halo-2,4-diamino-6-halophenoxypyrimidines is transformed to the corresponding 6-amino-1,2-dihydro-5-halo-1 - hydroxy - 2 - imino - 4 - phenoxypyrimidine and 6-amino - 1,2 - dihydro - 5 - halo - 4 - halophenoxy - 1 - hydroxy-2-iminopyrimidines, respectively.

Example 24.—6-amino-5-bromo-1,2-dihydro-1-hydroxy-2-imino-4-(1-pyrrolidinyl)pyrimidine A mixture of 6-amino-5-bromo-4-(2,4-dichlorophenoxy)-1,2-dihydro-1-hydroxy-2-iminopyrimidine (3.5 g.) and pyrrolidine (25 ml.) was heated at 70° C. for 2 hours. The reaction mixture was cooled, and the solid was filtered, washed successively with pyrrolidine and diethyl ether, and dried to give 6-amino-5-bromo-1,2-dihydro-1-hydroxy - 2 - imino - 4 - (1 - pyrrolidinyl)pyrimidine.

Following the procedure of Example 24 but using in place of the pyrrolidine, each of the above-mentioned primary and secondary including heterocyclic amines, there are obtained the corresponding 6-amino-5-bromo-1,2-dihydro-1-hydroxy-2-iminopyrimidines substituted at the 4-position with mono-substituted and disubstituted moieties, respectively.

Example 25.—6-amino-5-[(p-chlorophenyl)thio]-1,2-dihydro-1-hydroxy-2-imino-4-(1-pyrrolidinyl)pyrimidine A mixture of p-chlorothiophenol (2.3 g.) dimethylformamide (15 ml.) and sodium hydroxide (0.2 g.) was stirred under nitrogen until solution was complete, after which 6-amino-5-bromo-1,2-dihydro-1-hydroxy-2-imino-4-(1-pyrrolidinyl)pyrimidine (1.5 g) was added. The resulting mixture was heated at 95° C. for 3 hours, and was then filtered. The filtrate was cooled to 25° C. and mixed with a solution of sodium hydroxide (0.6 g.) in 100 ml. of water. That mixture was filtered, and the filtrate was allowed to stand several hours. Refiltration gave a filter cake which was recrystallized from acetonitrile to give 6-amino - 5 - [p - chlorophenyl)thio] - 1,2 - dihydro - 1 - hydroxy - 2 - imino - 4 - (1 - pyrrolidinyl)pyrimidine.

Following the procedure of Example 25 but substituting for the p-chlorothiophenol, thiophenol; p-methylthiophenol; o-ethylthiophenol; m-bromothiophenol; and o-fluorothiophenol, there are obtained 6-amino-1,2-dihydro-1-hydroxy-2-imino-5-phenylthio-4-(1-pyrrolidinyl)pyrimidine;
6-amino-1,2-dihydro-1-hydroxy-2-imino-5-[(p-methylphenyl)thio]-4-(1-pyrrolidinyl)pyrimidine;
6-amino-1,2-dihydro-5-[(o-ethylphenyl)thio[-1-hydroxy-2-imino-4-(1-pyrrolidinyl)pyrimidine;
6-amino-5-[(m-bromophenyl)thio]-1,2-dihydro-1-hydroxy-2-imino-4-(1-pyrrolidinyl)pyrimidine; and
6-amino-1,2-dihydro-5-[(o-fluorophenyl)thio]-1-hydroxy-2-imino-4-(1-pyrrolidinyl)pyrimidine, respectively.

Also following the procedure of Example 25 but substituting for the 6-amino-5-bromo-1,2-dihydro-1-hydroxy-2-imino-4-(1-pyrrolidinyl)pyrimidine, each of the above-mentioned 6-amino-5-halo-1,2-dihydro-1-hydroxy-2-iminopyrimidines substituted at the 4-position with mono-substituted and di-substituted including heterocyclic amino moieties, there are obtained the corresponding 6-amino-5-[p-chlorophenyl)thio]-1,2-dihydro-1-hydroxy - 2 - iminopyrimidines, substituted at the 4-position as in the reactant.

Also following the procedure of Example 25 but substituting for the combination of the 6-amino-5-bromo-1,2-dihydro-1-hydroxy-2-imino-4-(1 - pyrrolidinyl)pyrimidine and p-chlorothiophenol, each of the above-mentioned 6-amino-5-halo-1,2-dihydro-1-hydroxy-2-iminopyrimidines substituted at the 4-position with mono-substituted and disubstituted including heterocyclic amino moieties and each of the other above-mentioned thiophenols within the scope of Formula XXIII, above, there are obtained the corresponding 6-amino - 1,2 - dihydro-1-hydroxy-2-iminopyrimidines, substituted at the 4-position as in the pyrimidine reactant and substituted at the 5-position with an arylthio moiety corresponding to the particular thiophenol used.

Example 26.—6-amino-1,2-dihydro-1-hydroxy-2-imino-4,5-di-(1-pyrrolidinyl)pyrimidine A mixture of 6-amino-5-bromo-1,2-dihydro-1-hydroxy-2-imino-4-(1-pyrrolidinyl)pyrimidine (2.7 g.) and pyrrolidine (25 ml.) was heated in a sealed, heavy-wall, glass tube in a 120° C. oil bath for 2.5 hours. The tube was then cooled and opened, and the reaction mixture was evaporated to a dry residue under reduced pressure. That residue was extracted 4 times with 100-ml. portions of chloroform. The combined chloroform extracts were dried with anhydrous sodium sulfate and evaporated to give a solid residue. The latter residue was recrystallized from acetonitrile to give 6-amino - 1,2 - dihydro-1-hydroxy-2-imino-4,5-di-(1-pyrrolidinyl)pyrimidine.

Addition of absolute ethanol containing one equivalent of hydrogen chloride to an absolute ethanol solution of 6-amino-1,2-dihydro-1-hydroxy - 2 - imino-4,5-(1-pyrrolidinyl)pyrimidine, followed by addition of about 4 volumes of diethyl ether, gives the corresponding monohydrochloride. Similar use of ethanol containing 2 equivalents of hydrogen chloride gives the corresponding dihydrochloride. Similar use of benzoic acid, maleic acid, lactic acid, phosphoric acid, sulfuric acid, and succinic acid gives the corresponding mono- and diacid addition salts.

Following the procedure of Example 26 but substituting for the pyrrolidine, each of the above-mentioned primary and secondary including heterocyclic amines, there are obtained the corresponding free bases and acid addition salts of 6-amino-1,2-dihydro-1-hydroxy-2-imino-4-(1-pyrrolidinyl)pyrimidines substituted at the 5-position with mono-substituted and disubstituted including heterocyclic amino moieties.

Also following the procedure of Example 26 but substituting for the combination of the 6-amino-5-bromo-1,2-dihydro-1-hydroxy-2-imino-4-(1 - pyrrolidinyl)pyrimidine and the pyrrolidine, each of the above-mentioned 6-amino-5 - bromo-1,2-dihydro-1-hydroxy-2-iminopyrimidines substituted at the 4-position with mono-substituted or disubstituted including heterocyclic amino moieties and each of the above-mentioned primary and secondary including heterocyclic amines, there are obtained the corresponding free bases and acid addition salts of 6-amino-1,2-dihydro-1-hydroxy-2-iminopyrimidines substituted at the 4-position and at the 5-position with the same or different mono-substituted and disubstituted including heterocyclic amino moieties.

Example 27.—6-acetamido-2-acetylimino-1,2-dihydro-1-hydroxy-4-piperidinopyrimidine A mixture of 6-amino-1,2-dihydro-1-hydroxy-2-imino-4-piperidinopyrimidine (4.1 g.), acetic anhydride (4.0 ml.), and diethyl ether (200 ml.) was stirred at 25° C. for 60 hours. The solid which formed was filtered and washed with ether to give 5.5 g. of a solid, 3.0 g. of which was recrystallized from 400 ml. of dimethylformamide to give 1.5 g. of 6-acetamido - 2 - acetylimino-1,2-dihydro-1-hydroxy-4-piperidinopyrimidine; M.P. 204–205° C.

Analysis.—Calcd. for $C_{13}H_{19}N_5O_3$: C, 53.23; H, 6.53; N, 23.88. Found: C, 52.81; H, 6.23; N, 24.06.

U.V. (ethanol): 241 mμ ($\epsilon$=35,100); 291.5 mμ ($\epsilon$=21,000); 328 mμ ($\epsilon$=6000). (0.01 N $H_2SO_4$): 241 mμ ($\epsilon$=30,850); 291 mμ ($\epsilon$=19,050); sl. sh. 335 mμ ($\epsilon$=4050). (0.01 N KOH): 233 mμ ($\epsilon$=32,650); 261 mμ ($\epsilon$=13,950); 286 mμ ($\epsilon$=12,500). (Chloroform): 296 mμ ($\epsilon$=20,050); 341 mμ ($\epsilon$=5600).

I.R. (principal bands; mineral oil mull): 3160, 3060, 1710, 1680, 1630, 1565, 1535, 1480, 1255, 1225, 1205, 1180, 1130 cm.$^{-1}$.

Following the procedure of Example 27 but using acetyl chloride in place of the acetic anhydride, the same product is obtained. Also following the procedure of Example 27 but using in place of the acetic anhydride, propionic anhydride; crotonic anhydride; cyclohexanecarboxylic anhydride; isobutyryl chloride, decanoyl chloride, phenylacetyl chloride; 3-methoxybutyric anhydride; p-tert-butylcyclohexanecarbonyl chloride; and p-nitrophenylacetyl chloride, there are obtained 1,2-dihydro-1-hydroxy-4-piperidino-6-propionamido-2-propionyliminopyrimidine;
6-crotonamido-2-crotonoylimino-1,2-dihydro-1-hydroxy-4-piperidinopyrimidine;
6-cyclohexanecarboxyamido-2-cyclohexanecarbonylimino-1,2-dihydro-1-hydroxy-4-piperidinopyrimidine;
1,2-dihydro-1-hydroxy-6-isobutyramido-2-isobutyrylimino-4-piperidinopyrimidine;
6-decanamido-2-decanoylimino-1,2-dihydro-1-hydroxy-4-piperidinopyrimidine;
1,2-dihydro-1-hydroxy-4-piperidino-6-phenylacetamido-2-phenylacetyliminopyrimidine;
1,2-dihydro-1-hydroxy-6-(3-methoxybutyramido)-2-(3-methoxybutyrylimino)-4-piperidinopyrimidine;
6-(p-tert-butylcyclohexanecarboxamido)-2-(p-tert-butylcyclohexanecarbonylimino)-1,2-dihydro-1-hydroxy-4-piperidinopyrimidine; and
1,2-dihydro-1-hydroxy-6-(p-nitrophenylacetamido)-2-(p-nitrophenylacetylimino)-4-piperidinopyrimidine, respectively.

Also following the procedure of Example 27 but using in place of the 6-amino-1,2-dihydro-1-hydroxy-2-imino-4-piperidinopyrimidine, each of the above-mentioned 6-amino-1,2-dihydro-1-hydroxy-2-iminopyrimidines substituted at the 4-position with a mono-substituted or disubstituted including heterocyclic amino moiety or with a phenoxy or halophenoxy moiety, and unsubstituted at the 5-position or substituted at the 5-position with lower alkyl, lower alkenyl, lower aralkyl, lower cycloalkyl, chlorine, bromine, iodine, nitroso, nitro, amino, phenylthio, loweralkylphenylthio, halophenylthio, and a mono-substituted or disubstituted including heterocyclic amino moiety, there are obtained the corresponding 6-acetamido-2-acetylimino-1,2-dihydro-1-hydroxypyrimidines substituted at the 4-position and at the 5-position as in the reactant.

Also following the procedure of Example 27 but using in place of the combination of the 6-amino-1,2-dihydro-1-hydroxy-2-imino-4-piperidinopyrimidine and the acetic anhydride, each of the above-mentioned 6-amino-1,2-dihydro-1-hydroxy-2-iminopyrimidines, variously substituted at the 4-position as above-described and unsubstituted or variously substituted at the 5-position as above-described, and each of the above-mentioned carboxylic acid anhydrides and each of the above-mentioned carboxylic acid chlorides, there are obtained the corresponding 6-carboxyamido-2-carboxyacylimino-1,2-dihydro-1 - hydroxypyrimidines substituted at the 4-position and at the 5-position as in the reactant.

Also following the procedure of Example 27 but contacting each of the above-mentioned 6-amino-1,2-dihydro-1-hydroxypyrimidines with less of the carboxyacylating agent, preferably no more than one molecular equivalent thereof, and in the range about −10° to 10° C., carboxyacylates are obtained which contain substantial amounts of the corresponding O,N-diacylate and/or the corresponding N-monoacylate. For example, following the procedure of Example 27 but using 2.0 ml. of acetic anhydride and maintaining the reaction mixture in the range 0° to 5° C. for 24 hours, 2-acetylimino-6-amino-1,2- dihydro-1-hydroxy-4-piperidinopyrimidine and 1-acetoxy-2-acetylimino-6-amino - 1,2 - dihydro - 4 - piperidinopyrimidine are present in the acylation reaction mixture along with the N,N-diacylate, 6-acetamido-2-acetylimino-1,2-dihydro-1-hydroxy-4-piperidinopyrimidine. These three acylates are separated by fractional crystallization or chromatography.

Example 28.—6-acetamido-1-acetoxy-2-acetylimino-1,2-dihydro-4-piperidinopyrimidine A mixture of 6-amino-1,2-dihydro-1-hydroxy-2-imino-4-piperidinopyrimidine (4.1 g.) and acetic anhydride (25 ml.) was warmed in the range 70° to 80° C. for 60 hours. The excess acetic anhydride was then removed by distillation under reduced pressure and the residue was recrystallized from dimethylformamide to give the triacylate, 6-acetamido - 1 - acetoxy - 2 - acetylimino-1,2-dihydro-4-piperidinopyrimidine.

Example 29.—6-amino-2-benzoylimino-1-benzoyloxy-1,2-dihydro-4-piperidinopyrimidine Benzoic anhydride (4.5 g.) was added with swirling to a mixture of 6-amino-1,2-dihydro-1-hydroxy-2-imino-4-piperidinopyrimidine (4.1 g.) in 200 ml. of diethyl ether. The mixture was stirred at about 25° C. for 24 hours. The solid which formed was filtered, washed with diethyl ether, and dried to give 6-amino-2-benzoylimino-1-benzoyloxy-1,2-dihydro-4-piperidinopyrimidine.

Following the procedure of Example 29 but reducing the amount of benzoic anhydride to 2.25 g. (1 molecular equivalent), 6-amino - 2 - benzoylimino-1,2-dihydro-1-hydroxy-4-piperidinopyrimidine is obtained.

Also following the procedure of Example 29 but refluxing the reaction mixture for 24 hours, 6-benzamido-2-benzoylimino-1,2-dihydro-1-hydroxy-4 - piperidinopyrimidine is obtained.

Also following the procedure of Example 29 and the two above-described variations thereof, but using in place of the benzoic anhydride, p-toluic anhydride; m-chlorobenzoic anhydride; p-methoxybenzoic anhydride; p-(methylthio)benzoylchloride; o-nitrobenzoyl chloride; naphthoyl chloride; furoyl chloride; and 3-pyridinecarbonyl chloride, there are obtained the corresponding N-monoacylates, O,N-diacylates, and N,N-diacylates of 6-amino-1,2-dihydro-1-hydroxy-2-imino-4-piperidinopyrimidine.

Also following the procedure of Example 29 but using in place of the combination of the 6-amino-1,2-dihydro-1-hydroxy-2-imino-4-piperidinopyrimidine and the benzoic anhydride, each of the above-mentioned 6-amino-1,2-dihydro-1-hydroxy-2-iminopyrimidines substituted at the 4-position with a mono-substituted or disubstituted including heterocyclic amino moiety or with a phenoxy or halophenoxy moiety, and unsubstituted at the 5-position or substituted at the 5-position with lower alkyl, lower alkenyl, lower aralkyl, lower cycloalkyl, chlorine, bromine, iodine, nitroso, nitro, amino, phenylthio, loweralkylphenylthio, halophenylthio, and a mono-substituted or disubstituted including heterocyclic moiety, and each of the above-mentioned aromatic including heterocyclic carboxylic acid anhydrides and carboxylic acid chlorides, there are obtained the corresponding N-monoacylates, O,N-diacylates, N,N-diacylates of the 6-amino-1,2-dihydro-1-hydroxy-2-iminopyrimidines substituted at the 4-position and at the 5-position as in the reactant.

The following examples relate to the use of the novel compounds of this invention as antihypertensive agents. Each example relates to that use of 6-amino-1,2-dihydro-1-hydroxy-2-imino-4-piperidinopyrimidine. The other Formula I, II, III, IV, V and VI novel compounds of this invention and their acid addition salts can be used in a similar manner, and these examples should not be construed as limiting.

Example 30.—Tablets 20,000 scored tablets for oral use, each containing 200 mg. of 6-amino-1,2-dihydro-1-hydroxy-2-imino-4-piperidinopyrimidine free base are prepared from the following ingredients:

| | G. |
|---|---|
| 6-amino-1,2-dihydro-1-hydroxy - 2 - imino-4-piperidinopyrimidine, micronized | 4000 |
| Starch, U.S.P. | 350 |
| Talc, U.S.P. | 250 |
| Calcium stearate | 35 |

The micronized 6-amino-1,2-dihydro-1-hydroxy-2-imino-4-piperidinopyrimidine free base is granulated with a 4 percent w./v. aqueous solution of methylcellulose U.S.P. (1500 cps.). To the dried granules is added a mixture of the remainder of the ingredients and the final mixture is compressed into tablets of proper weight. Satisfactory clinical response is obtained in adults showing hypertension with 1 tablet which can be repeated in 4 hours, if necessary. For moderate conditions, a half tablet is used.

Example 31.—Capsules 20,000 two-piece hard gelatin capsules for oral use, each containing 100 mg. of 6-amino-1,2-dihydro-1-hydroxy-2-imino-4-piperidinopyrimidine free base are prepared from the following ingredients:

| | G. |
|---|---|
| 6 - amino - 1,2 - dihydro - 1 - hydroxy - 2 - imino - 4 - piperidinopyrimidine | 2000 |
| Lactose, U.S.P. | 1000 |
| Starch, U.S.P. | 300 |
| Talc, U.S.P. | 65 |
| Calcium stearate | 25 |

The micronized 6-amino-1,2-dihydro-1-hydroxy-2-imino-4-piperidinopyrimidine free base is mixed with the starch-lactose mixture followed by the talc and calcium stearate. The final mixture is then encapsulated in the usual manner. One capsule is used every 3 hours to control hypertension.

Capsules containing 10, 25, 50 and 350 mg. of 6-amino-1,2 - dihydro - 1 - hydroxy - 2 - imino - 4 - piperidinopyrimidine free base are also prepared by substituting 200, 500, 1000 and 7000 g. for 2000 g. in the above formulation.

Example 32.—Soft elastic capsules

One-piece soft elastic capsules for oral use, each containing 5 mg. of 6-amino-1,2-dihydro-1-hydroxy-2-imino-4-piperidinopyrimidine free base are prepared in the usual manner by first dispersing the powdered active material in sufficient corn oil to render the material capsulatable.

Example 33.—Aqueous preparation

An aqueous preparation for oral use containing in each 5 ml., 50 mg. of 6-amino-1,2-dihydro-1-hydroxy-2-imino-4-piperidinopyrimidine hydrochloride is prepared from the following ingredients:

| | | |
|---|---|---|
| 6 - amino - 1,2 - dihydro - 1 - hydroxy - 2 - imino-4-piperidinopyrimidine hydrochloride | g | 100 |
| Methylparaben, U.S.P. | g | 7.5 |
| Propylparaben, U.S.P. | g | 2.5 |
| Saccharin sodium | g | 12.5 |
| Cyclamate sodium | g | 2.5 |
| Glycerin | ml | 3000 |
| Tragacanth powder | g | 10 |
| Orange oil flavor | g | 10 |
| F.D. and C. orange dye | g | 7.5 |
| Deionized water, q.s. to | ml | 10,000 |

Example 34.—Parenteral suspension

A sterile aqueous suspension suitable for intramuscular injection and containing in each milliliter, 25 mg. of 6 - amino - 1,2 - dihydro - 1 - hydroxy - 2 - imino - 4-piperidinopyrimidine free base is prepared from the following ingredients:

| | | |
|---|---|---|
| Polyethylene glycol 4000, U.S.P. | g | 3 |
| Sodium chloride | g | 0.9 |
| Polysorbate 80, U.S.P. | g | 0.4 |
| Sodium metabisulfite | g | 0.1 |
| Methylparaben, U.S.P. | g | 0.18 |
| Propylparaben, U.S.P. | g | 0.02 |
| 6 - amino - 1,2 - dihydro - 1 - hydroxy - 2 - imino - 4-piperidinopyrimidine free base (micronized) | g | 2.5 |
| Water for injection, q.s. to | ml | 100 |

Example 35.—Aqueous solution

An aqueous solution for oral use and containing in each 5 ml., 25 mg. of 6-amino-1,2-dihydro-1-hydroxy-2-imino-4-piperidinopyrimidine free base is prepared from the following ingredients:

| | | |
|---|---|---|
| 6 - amino - 1,2 - dihydro - 1 - hydroxy - 2 - imino-4-piperidinopyrimidine free base | g | 5 |
| Deionized water, q.s. to | ml | 1000 |

Example 36.—Parenteral solution

A sterile aqueous solution for intravenous or intramuscular injection and containing 20 mg. of 6-amino-1,2-dihydro - 1 - hydroxy - 2 - imino - 4 - piperidinopyrimidine maleate in each 2 ml. is prepared from the following ingredients:

| | | |
|---|---|---|
| 6 - amino - 1,2 - dihydro - 1 - hydroxy - 2 - imino-4-piperidinopyrimidine maleate | g | 10 |
| Chlorobutanol | g | 3 |
| Water for injection, q.s. to | ml | 1000 |

Example 37.—Capsules

One thousand hard gelatin capsules for oral use, each containing 25 mg. of 6-amino-1,2-dihydro-1-hydroxy-2-imino-4-piperidinopyrimidine free base and 25 mg. of hydrochlorothiazide are prepared from the following ingredients:

| | G. |
|---|---|
| 6-amino-1,2-dihydro-1-hydroxy-2-imino-4-piperidinopyrimidine free base micronized | 25 |
| Hydrochlorothiazide | 25 |
| Starch | 125 |
| Talc | 25 |
| Magnesium stearate | 15 |

One capsule 2 to 4 times a day is advantageous in the relief of moderate to severe hypertension in adult humans.

Example 38.—Capsules

One thousand hard gelatin capsules for oral use, each containing 50 mg. of 6-amino-1,2-dihydro-1-hydroxy-2-imino-4-piperidinopyrimidine free base, 25 mg. of hydrochlorothiazide, 0.1 mg. of reserpine, and 400 mg. of potassium chloride are prepared from the following ingredients:

| | G. |
|---|---|
| 6-amino-1,2-dihydro-1-hydroxy-2-imino-4-piperidinopyrimidine free base micronized | 50 |
| Hydrochlorothiazide | 25 |
| Reserpine | 0.1 |
| Potassium chloride | 400 |
| Talc | 75 |
| Magnesium stearate | 20 |

One or two capsules daily is advantageously used for reducing hypertension.

Example 39.—Tablets

Ten thousand tablets for oral use, each containing 50 mg. of 6-amino-1,2-dihydro-1-hydroxy-2-imino-4-piperidinopyrimidine free base and 25 mg. of chlorisondamine chloride, are prepared from the following ingredients:

| | G. |
|---|---|
| 6-amino-1,2-dihydro-1-hydroxy-2-imino-4-piperidinopyrimidine free base | 500 |
| Chlorisondamine chloride | 250 |
| Lactose | 1200 |
| Corn starch | 500 |
| Talc | 500 |
| Calcium stearate | 25 |

The powdered ingredients are thoroughly mixed and slugged. The slugs are broken down into granules which are then compressed into tablets. For relief of hypertension is adult humans, 1 tablet is administered 1 to 4 times daily after meals.

Example 40.—Tablets

Ten thousand scored tablets for oral use, each containing 25 mg. of 6-amino-1,2-dihydro-1-hydroxy-2-imino-4-piperidinopyrimidine free base and 0.1 mg. of reserpine, are prepared from the following ingredients and using the procedure of Example 10.

| | G. |
|---|---|
| 6-amino-1,2-dihydro-1-hydroxy-2-imino-4-piperidinopyrimidine free base | 250 |
| Reserpine | 1 |
| Lactose | 1500 |
| Corn starch | 500 |
| Talc | 500 |
| Calcium stearate | 25 |

This combination of active materials is effective in adult humans for the reduction of hypertension. The dose is one-half to two tablets 3 times a day depending on the severity of the condition.

Example 41.—Capsules

Ten thousand hard gelatin capsules for oral use, each containing 25 mg. of 6-amino-1,2-dihydro-1-hydroxy-2-imino-4-piperidinopyrimidine free base and 200 mg. of meprobamate, are prepared from the following ingredients:

| | G. |
|---|---|
| 6-amino-1,2-dihydro-1-hydroxy-2-imino-4-piperidinopyrimidine free base | 250 |
| Meprobamate | 2000 |
| Starch | 350 |
| Talc | 250 |
| Calcium stearate | 150 |

One capsule 4 times a day is useful in the treatment of hypertension.

Example 42.—Tablets

Ten thousand tablets for oral use, each containing 25 mg. of 6-amino-1,2-dihydro-1-hydroxy-2-imino-4-piperidinopyrimidine free base and 40 mg. of ethoxzolamide, are prepared from the following ingredients:

| | G. |
|---|---|
| 6-amino-1,2-dihydro-1-hydroxy-2-imino-4-piperidinopyrimidine free base | 250 |
| Ethoxzolamide | 400 |
| Lactose | 1200 |
| Corn starch | 500 |
| Talc | 500 |
| Calcium stearate | 25 |

The powdered ingredients are thoroughly mixed and slugged. The slugs are broken into granules which are then compressed into tablets. For relief of hypertension in adult humans, 1 tablet is administered 2 to 4 times daily.

We claim:

1. A compound selected from the group consisting of the free base form and acid addition salts of a compound of the formula:

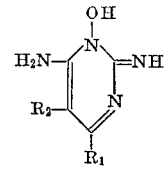

wherein $R_1$ is a moiety selected from the group consisting of moieties of the formula

wherein $R_3$ and $R_4$ are selected from the group consisting of hydrogen, lower alkyl, lower alkenyl, lower aralkyl, and lower cycloalkyl, with the proviso that both $R_3$ and $R_4$ are not hydrogen, and the heterocyclic moieties, aziridinyl, azetidinyl, pyrrolidinyl, piperidino, hexahydroazepinyl, heptamethylenimino, octamethylenimino, morpholino, and 4-lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of $R_1$ to the ring in said formula, and wherein $R_2$ is selected from the group consisting of hydrogen, lower alkyl, lower alkenyl, lower alkoxyalkyl, lower cycloalkyl, lower, aryl, lower aralkyl, lower alkaryl, lower alkaralkyl, lower alkoxyaralkyl, and lower haloaralkyl.

2. A compound according to claim 1 wherein $R_1$ is piperidino and $R_2$ is hydrogen.

3. A compound of the formula:

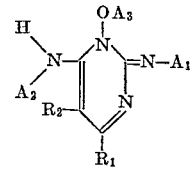

wherein $R_1$ is a moiety selected from the group consisting of moieties of the formula

wherein $R_3$ and $R_4$ are selected from the group consisting of hydrogen, lower alkyl, lower alkenyl, lower aralkyl, and lower cycloalkyl, with the proviso that both $R_3$ and $R_4$ are not hydrogen, and the heterocyclic moieties, aziridinyl, azetidinyl, pyrrolidinyl, piperidino, hexahydroazepinyl, heptamethylenimino, octamethylenimino, morpholino, and 4-lower-alkylpiperazinyl, each of said heterocyclic moieties having attached as substituents on carbon atoms thereof zero to 3 lower alkyls, inclusive, a nitrogen atom of each of said heterocyclic moieties being the point of attachment of $R_1$ to the ring in said formula, wherein $R_2$ is selected from the group consisting of hydrogen, lower alkyl, lower alkenyl, lower alkoxyalkyl, lower cycloalkyl, lower aryl, lower aralkyl, lower alkaryl, lower alkaralkyl, lower alkoxyaralkyl, and lower haloaralkyl, and wherein $A_1$, $A_2$ and $A_3$ are each selected from the group consisting of hydrogen and carboxyacyl, with the proviso that at least one of $A_1$ and $A_2$ are carboxyacyl.

4. A compound according to claim 3 wherein $R_1$ is piperidino, $R_2$ is hydrogen, $A_1$ and $A_2$ are acetyl, and $A_3$ is hydrogen.

References Cited

UNITED STATES PATENTS

| | | | |
|---|---|---|---|
| 1,915,334 | 6/1933 | Salzberg et al. | 167—22 |
| 2,075,359 | 3/1937 | Salzberg et al. | 167—22 |
| 2,425,320 | 8/1947 | Hill | 252—149 |
| 2,487,569 | 11/1949 | Mackey | 260—256.4 |
| 2,577,039 | 12/1951 | Roth | 260—256.4 |
| 2,606,155 | 8/1952 | Hill | 252—149 |
| 3,087,910 | 4/1963 | Wear | 260—256.4 |
| 3,192,216 | 6/1965 | Gray et al. | 260—256.4 |
| 3,202,650 | 8/1965 | Steinemann | 260—256.4 |
| 3,270,014 | 8/1966 | Ursprung et al. | 260—256.4 |
| 3,270,015 | 8/1966 | Ursprung et al. | 260—256.4 |

OTHER REFERENCES

Burger, Medicinal Chemistry, 2nd ed., 1960, p. 78.
Culvenor, Rev. Pure. App. Chem., vol. 3 (1953), pp. 83–8.

ALEX MAZEL, Primary Examiner

R. J. GALLAGHER, Assistant Examiner

U.S. Cl. X.R.

260—247, 256; 424—251

UNITED STATES PATENT OFFICE
CERTIFICATE OF CORRECTION

Patent No. 3,461,461      Dated August 12, 1969

Inventor(s) William C. Anthony, and Joseph J. Ursprung

It is certified that error appears in the above-identified patent and that said Letters Patent are hereby corrected as shown below:

Column 4, line 28, for "representned" read -- represented --.
Column 7, line 12, for "II" read -- III --; line 64, for
"-phenoxypyrimides," read -- -phenoxypyrimidines, --. Column 11,
line 71, for "zine" read -- zinc --. Column 12, line 37 and 38,
for "substituets" read -- substituents --. Column 13, line 47,
for "mixing pyrimidine" read -- mixing the pyrimidine --; line 50
for "nitrile" read -- nitrite --; line 53, for "about 250 C." rea
-- about 25° C. --. Column 14, line 24, for "for the" read --
from the --; line 32, for "XII of" read -- XII or --. Column 16,
line 33, for "reaciton" read -- reaction --. Column 18, line 5,
for "usually given" read -- usually give --. Column 19, line 54,
for "amout" read -- about --. Column 21, line 17, for "maneral"
read -- mineral --. Column 22, line 7, for "5-o-methyl" read --
5-(o-methyl --. Column 23, line 28, for "2,4-amino-" read -- 2,4
diamino- --; line 40, for "5° C. for 3 hours and was then
filtered." read -- 5° C. for 3 hours. --; line 41, for "The filte
case was" read -- The solid which formed was filtered to give --.
Column 24, line 35, for "2-mino" read -- 2-imino --; line 36, for
"hydoxy" read -- hydroxy --. Column 25, line 28, for "butylpheny
read -- butylphenyl) --; line 58, for "stubstituted" read --
substituted --. Column 26, line 5, for "3220" read -- 3420 --;
line 47, for "and 6-amino" read -- and N-methylpiperazine, there
are obtained 6-amino- --. Column 31, line 70, for "Example 16"
read -- example 17. --. Column 34, line 10, for "-5-[p-" read
-- -5[(p- --; line 68, for "-4,5-(1-" read -- -4,5-di-(1- --.
Column 40, line 63, for "lower, aryl," read -- claim 1: lower
aryl, --.

SIGNED AND
SEALED

SEP 1 - 1970

(SEAL)
Attest:

Edward M. Fletcher, Jr.
Attesting Officer

WILLIAM E. SCHUYLER, JR.
Commissioner of Patents